(12) United States Patent
Ozawa et al.

(10) Patent No.: US 6,492,454 B1
(45) Date of Patent: Dec. 10, 2002

(54) RUBBER COMPOSITION CONTAINING RUBBER, MERCAPTO-TRIAZINE AND EPOXY GRAFTER POLYMER

(75) Inventors: Osamu Ozawa, Kanagawa Prefecture (JP); Tomoji Saitoh, Kanagawa Prefecture (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/542,044

(22) Filed: Mar. 31, 2000

(30) Foreign Application Priority Data

| Apr. 1, 1999 | (JP) | ............................. 11-094823 |
| Feb. 29, 2000 | (JP) | ...................... 2000-053378 |
| Feb. 29, 2000 | (JP) | ...................... 2000-053379 |

(51) Int. Cl.$^7$ ............................. C08K 3/36; C08C 19/40
(52) U.S. Cl. ..................... 524/493; 525/113; 525/330.4; 525/331.8
(58) Field of Search ............................. 525/113, 330.4, 525/331.8, 333.9; 524/493

(56) References Cited

U.S. PATENT DOCUMENTS

| 4,530,994 A | | 7/1985 | Shimizu et al. ............. 525/403 |
| 4,826,925 A | * | 5/1989 | Ozawa .................... 525/331.8 |
| 5,089,554 A | | 2/1992 | Bomo et al. ................ 524/493 |
| 6,268,417 B1 | | 7/2001 | Ozawa et al. ............... 524/100 |

FOREIGN PATENT DOCUMENTS

| JP | 55125155 | 9/1980 |
| JP | 62-62838 | 3/1987 |
| JP | 62-104864 | 5/1987 |
| JP | 03-31338 | 2/1991 |

* cited by examiner

Primary Examiner—Christopher Henderson
(74) Attorney, Agent, or Firm—Finnegan, Henderson, Farabow, Garrett & Dunner, L.L.P.

(57) ABSTRACT

A rubber composition having high adhesiveness to a metal, high modulus, high set resistance and high heat resistance, comprising raw material rubber, 2,4-dimercapto-6-substituted-1,3,5-triazine and a polymer having epoxy groups crosslinkable with the raw material rubber; a process for producing the rubber composition exhibiting adhesion stability, by controlling temperature of mixing step when crosslinking the rubber composition with an organic crosslinking agent; and a hose having excellent heat resistance and sufficient modulus and compression set resistance, wherein an inner tube and/or outer cover comprise the rubber composition and a reinforcing layer comprises brass-plated steel wires. Further, a compounding agent having good handling property comprising triallyl isocyanurate or the like supported on silica (solidified product), obtained by heat treating a mixture of triallyl isocyanurate or the like and silica, and a rubber composition having high modulus while maintaining high heat resistance, containing the same.

11 Claims, 2 Drawing Sheets

RUBBER COMPOSITION CONTAINING RUBBER, MERCAPTO-TRIAZINE AND EPOXY GRAFTER POLYMER

BACKGROUND OF THE INVENTION

1. Field of the Invention

The present invention relates to a rubber composition having high adhesiveness to a metal, high modulus, high compression set resistance and high heat resistance, which enables the production of rubber/metal composite products to be used in the fields that require heat resistance and oil resistance. The present invention further relates to the composition can be suitably used for the products such as hoses, belts, tires, rolls and mold goods, and a producing method thereof. The present invention also relates to a hose having excellent adhesiveness between an inner tube and the like comprising the rubber composition and a reinforcing layer and excellent heat resistance. The present invention further relates to a rubber compounding agent that is easy-handling and improves heat resistance and modulus of a rubber, and a rubber composition containing the same.

2. Description of the Related Art

In recent years, many rubber products such as hoses, belts, tires, rolls and mold goods come to be used under high temperature and high pressure and also together with an oil heated for a long time, and deterioration of rubber products under such conditions always brings significant problems. If deterioration of rubber products is remarkable, very much time and labor are needed for maintenance or replacement of such deteriorated rubber products. Sometimes deterioration of rubber products may cause a large accident.

Conventional polymers that can be durable to continuous use under such high temperature (about 120–150° C.) environment are acrylonitrile-butadiene copolymer rubber (NBR), ethylene-propylene copolymer rubber (EPM), ethylene-propylene-diene copolymer rubber (EPDM), acrylic rubber (ACM), ethylene-acrylic acid ester copolymer rubber (AEM), ethylene-acrylic acid ester-vinyl acetate copolymer rubber (ER), ethylene-vinyl acetate copolymer rubber (EVM), chlorosulfonated polyethylene rubber (CSM), chlorinated polyethylene rubber (CM) and hydrogenated acrylonitrile-butadiene copolymer rubber (HNBR) obtained by hydrogenating a conjugated diene portion of acrylonitrile-butadiene copolymer rubber (NBR).

In general, in rubber compositions, it is known that an organic peroxide-crosslinked rubber composition using an organic peroxide has excellent heat resistance as compared with a sulfur-vulcanized rubber composition using sulfur in vulcanization.

However, the organic peroxide-crosslinked rubber composition does not generally contain sulfur that reacts with a metal for adhesion. As a result, such an organic peroxide-crosslinked rubber composition has poor adhesiveness to a metal surface and does not adhere to a brass that is plated on a metal surface. Therefore, rubber products composed of a combination of such an organic peroxide-crosslinked rubber composition and a metal such as a brass-plated steel plate have defects in that separation occurs at the interface between a rubber layer and a plated layer, resulting in breakage of the goods.

Diene rubber widely used in rubber products have excellent adhesiveness to a metal but do not have excellent heat resistance if sulfur in an ordinary amount is used as a crosslinking agent and an adhesive promoter is also compounded for improving adhesiveness to a metal. Further, where an adhesive promoter is not compounded, the amount of sulfur compounded is decreased that the ordinarily used amount and a vulcanization accelerator such as a sulfur donor is used together, for the purpose of improving heat resistance, heat resistance is improved but adhesiveness to a metal is decreased, resulting in impairing adhesiveness. Also, if an organic peroxide is used as a crosslinking agent for the improvement of heat resistance, heat resistance is excellent but adhesiveness to a metal is poor.

On the other hand, non-diene rubbers have excellent heat resistance and hence are used in various uses. However, non-diene rubber is difficult for vulcanization with sulfur, and it is necessary to crosslink with an organic peroxide or the like. In other words, since sulfur giving good adhesiveness to a metal cannot be used as a crosslinking agent, it is extremely difficult to directly adhere non-diene rubber to a metal. Various proposals have been made on formulation for developing adhesiveness. For example, JP-A-55-125155 describes that a polymer composition comprising an organic peroxide-crosslinkable polymer, organic peroxide, an epoxy resin and 2,4-dimercapto-6-R-1,3,5-triazine has a good adhesiveness to brass. From the results of our investigation and the contents of description in examples of the JP-A, it is presumed that the good adhesiveness is due to utilization of a reaction of chlorine in a chlorine-containing polymer such as chlorinated polyethylene with 2,4-dimercapto-6-R-1,3,5-triazine, a reaction of 2,4-dimercapto-6-R-1,3,5-triazine with an epoxy resin and a reaction of 2,4-dimercapto-6-R-1,3,5-triazine with copper in brass. However, since a reaction for adhesion does not occur in the case of chlorine-free polymers, there is a defect that such an adhesiveness does not sufficiently satisfy the adhesiveness in the level presently required.

For example, wires used as a reinforcing material of rubber hoses are generally high carbon steel wires, and in many cases, the wires are plated with brass to improve adhesiveness to a rubber.

However, where hydrogenated acrylonitrile-butadiene copolymer rubber (HNBR) or ethylene-acrylic acid ester copolymer rubber (AEM) such as ethylene-methyl acrylate copolymer rubber, having excellent heat resistance are used as, for example, an inner tube of a hose, those rubber are non-diene rubber which do not have unsaturated bonds in the main chain or side chains, and therefore sulfur cannot be used as a crosslinking agent. As a result, the non-diene rubber does not adhere to a reinforcing layer comprising reinforcing steel wires plated with brass.

Thus, regardless of diene rubber or non-diene rubber, rubber is demanded to overcome the above-described problems and to satisfy both adhesiveness to a metal and heat resistance.

Further, from the point of light-weight of rubber compositions, demand for high rigidity of rubber compositions is increasing, and rubber compositions having high modulus are demanded. There are various techniques to improve modulus of rubber compositions but on the other hand, there is disadvantage of impairing other physical properties, particularly heat resistance. Thus, it is necessary to optimize the physical properties in every rubber composition while balancing the physical properties.

Crosslinking aids have conventionally be used in rubber compositions crosslinked with organic peroxide to improve modulus (ex. stress at 100% elongation). Bifunctional or multifunctional polymerizable monomers are generally used as the crosslinking aids. Of those, triallyl isocyanurate (TAIC) and triallyl cyanurate (TAC) are known as having high efficiency of co-crosslinking and particularly high effect to improve modulus. However, triallyl isocyanurate has a melting point in the vicinity of 25° C. and triallyl cyanurate has a melting point in the vicinity of 27° C. Therefore, there are the disadvantages that those compounds are liquid if temperature is high, which are difficult to mix with a solid material, and those compounds are solid if temperature is low, which are also difficult to mix with a solid material, thus handling properties are poor. It is thus desired to overcome those problems.

Further, where TAIC and/or TAC and silica are used together, handling properties not only TAIC and/or TAC but also silica become problem in many cases. Specifically, since silica has a strong hydrophilicity, there is the problem that it is difficult for silica to be uniformly dispersed in the case of mixing with a hydrophobic material, and there is also the problem that silica is scattered in air in working because of the bulkiness thereof.

On the other hand, there are many cases that organic peroxide-crosslinkable rubber compositions, particularly organic peroxide-crosslinkable rubber compositions comprising a polymer in which the main chain is a methylene chain, as the main component of a raw material rubber are used for rubber compositions requiring high heat resistance.

However, if TAIC and/or TAC are used in large amount in the rubber compositions comprising a polymer in which the main chain is a methylene chain, as the main component of a raw material rubber in order to impart high modulus, those do not contribute to co-crosslinking, thereby increasing the proportion of the self-curable rubber components. As a result, the inherent heat resistance of rubber compositions is impaired and in addition, breakage strength such as tear strength or tensile strength deteriorates. Thus, it was practically impossible to make modulus remarkably high by adding a large amount of TAIC and/or TAC.

Therefore, a compounding agent for rubber that does not impair heat resistance and can realize high modulus is desired regarding the organic peroxide-crosslinkable rubber compositions comprising a polymer in which the main chain is a methylene chain, as the main component of a raw material rubber.

SUMMARY OF THE INVENTION

Accordingly, one object of the present invention is to provide a rubber composition that has high adhesiveness to a metal (brass), high modulus, high compression set resistance and high heat resistance and due to those properties, can suitably be used in composite products of a rubber and a metal, such as hoses, belts, tires, rolls and molded products.

Another object of the present invention is to provide a process for producing the rubber composition that exhibits adhesion stability of the rubber composition.

Still another object of the present invention is to provide a hose having excellent heat resistance, durability and the like in which a reinforcing layer comprises a reinforcing steel wire plated with brass and the rubber composition is used as an inner tube material that adhesiveness between the inner tube and the reinforcing layer is excellent and heat resistance, modulus and compression set resistance are particularly good.

Further object of the present invention is to provide TAIC and/or TAC supported on silica, used in a compounding agent for a rubber, having good handling properties, and a compounding agent for a rubber, comprising the same.

Still further object of the present invention is to provide a rubber composition having improved modulus while maintaining high heat resistance by using the compounding agent in an organic peroxide-crosslinkable non-diene raw material rubber composition, particularly a rubber composition containing a polymer having a methylene chain as the main chain.

According a first embodiment of the present invention, there is provided a rubber composition comprising:

(1) 100 parts by mass of a raw material rubber, with the exception of a copolymer rubber having an iodine value of 15 or less, having in a polymer chain 10 to 45% by mass of a unit portion from an unsaturated nitrile (Y portion; VCN), 0 to 5% by mass of a unit portion from a conjugated diene (Z portion; C=C) and 90 to 50% by mass of a unit portion obtained by hydrogenating a unit portion from a unit portion from an ethylenically unsaturated monomer other than the unsaturated nitrile and/or a unit portion of the conjugated diene (X portion; C—C);

(2) 0.1 to 15 parts by mass of 2,4-dimercapto-6-substituted-1,3,5-triazine represented by the following formula 1:

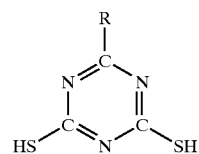

wherein R represents a group selected from the group consisting of mercapto group, alkoxyl group, monoalkylamino group, diaklylamino group, monocycloalkylamino group, dicycloalkylamino group and N-alkyl-N-arylamino group; and (3) 1 to 100 parts by mass of a polymer having epoxy groups crosslinkable with the raw material rubber.

Preferred embodiments in the first embodiment are as follows.

Preferred rubber composition of the present invention is an organic peroxide-crosslinkable raw material rubber, with the exception of a copolymer rubber having an iodine value of 15 or less, having in a polymer chain 10 to 45% by mass of a unit portion from an unsaturated nitrile (Y portion; VCN), 0 to 5% by mass of a unit portion from a conjugated diene (Z portion; C=C) and 90 to 50% by mass of a unit portion obtained by hydrogenating a unit portion from a unit portion from an ethylenically unsaturated monomer other than the unsaturated nitrile and/or a unit portion of the conjugated diene (X portion; C—C), and the polymer having epoxy groups is an organic peroxide-crosslinkable polymer.

Preferred rubber composition of the present invention is that the organic peroxide-crosslinkable raw material rubber is a diene rubber.

Preferred rubber composition of the present invention is that the organic peroxide-crosslinkable raw material rubber is a non-diene rubber, with the exception of a copolymer rubber having an iodine value of 15 or less, having in a polymer chain 10 to 45% by mass of a unit portion from an unsaturated nitrile (Y portion; VCN), 0 to 5% by mass of a unit portion from a conjugated diene (Z portion; C=C) and 90 to 50% by mass of a unit portion obtained by hydrogenating a unit portion from a unit portion from an ethylenically unsaturated monomer other than the unsaturated nitrile and/or a unit portion of the conjugated diene (X portion; C—C).

Preferred rubber composition of the present invention is that the organic peroxide-crosslinkable raw material rubber is at least one member selected from the group consisting of ethylene-acrylic acid ester copolymer rubber, ethylene-acrylic acid ester-vinyl acetate copolymer rubber and ethylene-vinyl acetate copolymer rubber.

Preferred rubber composition of the present invention is that the organic peroxide-crosslinkable raw material rubber is selected from the group consisting of ethylene-propylene copolymer rubber and/or ethylene-propylene-diene copolymer rubber.

Preferred rubber composition of the present invention is that the organic peroxide-crosslinkable raw material rubber is selected from the group consisting of chlorinated polyethylene rubber and/or chlorosulfonated polyethylene rubber.

Preferred rubber composition of the present invention is that the diene rubber is acrylonitrile-butadiene copolymer rubber.

Preferred rubber composition of the present invention is that the raw material rubber is a sulfur-crosslinkable raw material rubber, and the polymer having epoxy groups is a sulfur-crosslinkable polymer.

Preferred rubber composition of the present invention is that the raw material rubber an d the polymer having epoxy groups are a raw material rubber having epoxy groups.

Further preferred rubber composition of the present invention is that the raw material rubber having epoxy groups is acrylic rubber containing a monomer having epoxy groups as a copolymerizable component.

Further preferred rubber composition of the present invention is that the rubber composition further comprises 0.1 to 30 parts by mass of at least one member selected from the group consisting of triallyl isocyanurate and triallyl cyanurate.

Further preferred rubber composition of the present invention is that the rubber composition further comprises 1 to 50 parts by mass of silica.

According to a second embodiment of the present invention, there is provided a process for producing a rubber composition comprising:

(1) 100 parts by mass of an organic peroxide-crosslinkable raw material rubber;

(2) 0.1 to 15 parts by mass of 2,4-dimercapto-6-substituted-1,3,5-triazine represented by the following formula 1:

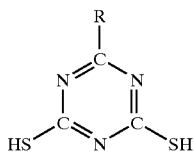

wherein R represents a group selected from the group consisting of mercapto group, alkoxyl group, monoalkylamino group, diaklylamino group, monocycloalkylamino group, dicycloalkylamino group and N-alkyl-N-arylamino group; and (3) 1 to 100 parts by mass of a polymer having organic peroxide-crosslinkable epoxy groups; and (4) 1 to 10 parts by mass of organic peroxide, which comprises maintaining a temperature of a mixture at 140° C. or lower through the overall steps of from mixing the raw material rubber with at least one of the remaining components to mixing all the components.

Preferred embodiment in the second embodiment is as follows.

Preferred process for producing the rubber composition of the present invention is that temperature of the mixture in the steps after addition of the 2,4-dimercapto-6-substituted-1,3,5-triazine is 100° C. or lower.

According to a third embodiment of the present invention, there is provided a hose comprising a rubber composition which comprises:

(1) 100 parts by mass of an organic peroxide-crosslinkable raw material rubber;

(2) 0.1 to 15 parts by mass of 2,4-dimercapto-6-substituted-1,3,5-triazine represented by the following formula 1:

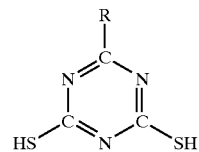

wherein R represents a group selected from the group consisting of mercapto group, alkoxyl group, monoalkylamino group, diaklylamino group, monocycloalkylamino group, dicycloalkylamino group and N-alkyl-N-arylamino group; and (3) 1 to 100 parts by mass of a polymer having organic peroxide-crosslinkable epoxy groups; and (4) 1 to 10 parts by mass of an organic peroxide.

Preferred embodiments in the third embodiment are as follows.

Preferred hose of the present invention is that the raw material rubber in the rubber composition forming the inner tube and/or outer cover is a copolymer rubber having an iodine value of 15 or less, having in a polymer chain 10 to 45% by mass of a unit portion from an unsaturated nitrile (Y portion; VCN), 0 to 5% by mass of a unit portion from a conjugated diene (Z portion; C=C) and 90 to 50% by mass of a unit portion obtained by hydrogenating a unit portion from a unit portion from an ethylenically unsaturated monomer other than the unsaturated nitrile and/or a unit portion of the conjugated diene (X portion; C—C).

Preferred hose of the present invention is that the raw material rubber in the rubber composition forming the inner tube and/or outer cover is ethylene-acrylic acid ester copolymer rubber (AEM).

Preferred hose of the present invention is that the inner tube comprises a rubber composition containing the HNBR, and the outer cover comprises a rubber composition containing the AEM.

According to a fourth embodiment of the present invention, there is provided triallyl isocyanurate and/or triallyl cyanurate supported on silica, comprising 30 to 80% by mass of isocyanurate and/or cyanurate and/or their oligomers and 70 to 20% by mass of silica, the isocyanurate and/or cyanurate is obtained by heat treating triallyl isocyanurate and/or triallyl isocyanurate in the presence of silica.

According to a fifth embodiment of the present invention, there is provided a compounding agent for a rubber, comprising the triallyl isocyanuarate and/or triallyl cyanurate supported on silica.

According to a sixth embodiment of the present invention, there is provided a rubber composition comprising:

(1) 100 parts by mass of an organic peroxide-crosslinkable raw material rubber;

(4) 1 to 10 parts by mass of an organic peroxide; and (5) 0.5 to 100 parts by mass of the compounding agent for a rubber.

Preferred embodiment in the sixth embodiment is as follows.

Preferred rubber composition of the present invention is that the raw material rubber mixed with the compounding agent for a rubber is a polymer in which the main chain is a methylene chain.

DETAILED DESCRIPTION OF THE INVENTION

Figure 1:
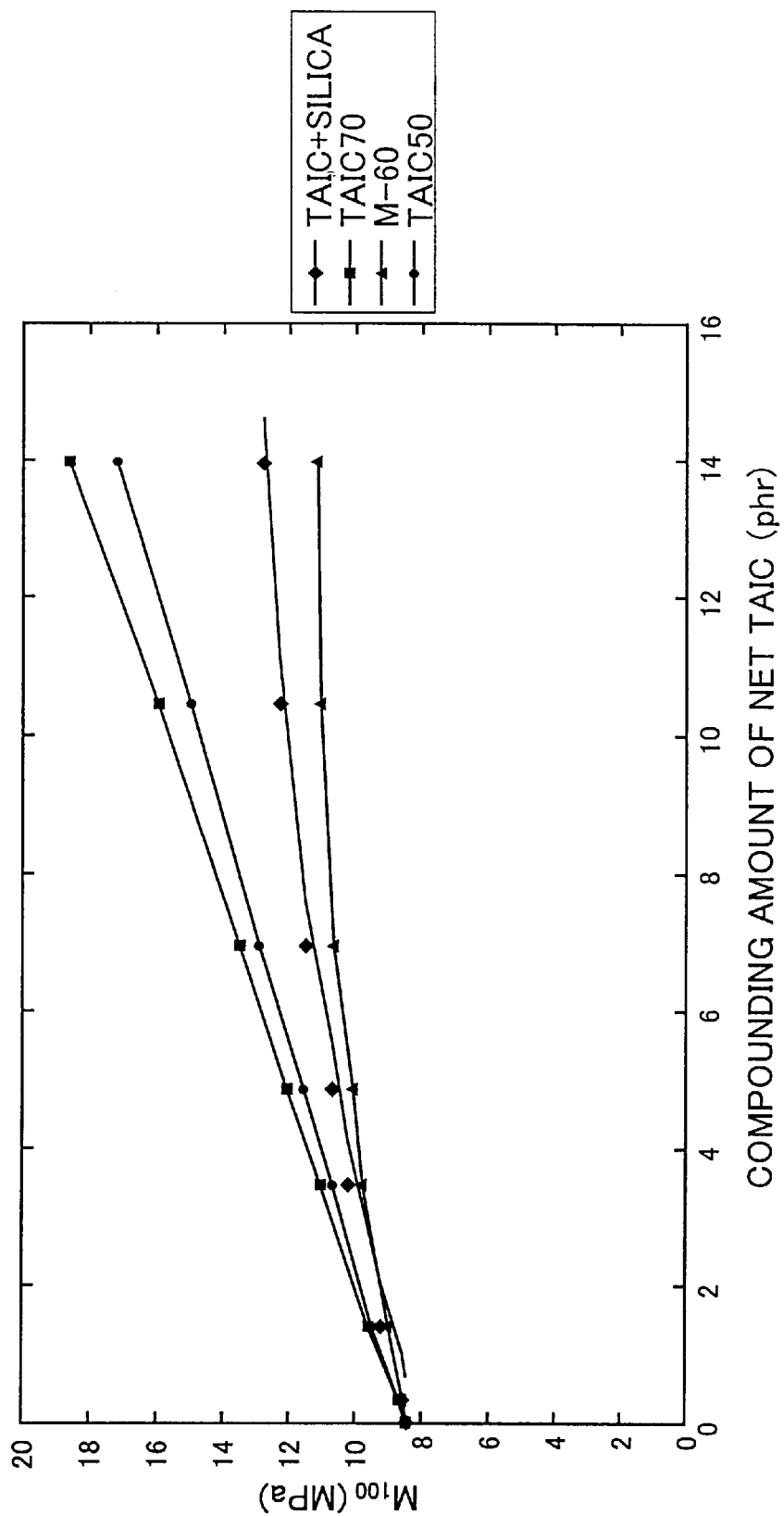
FIG. 1 is a graph showing that the solidified product (triallyl isocyanurate and/or triallyl cyanurate supported on silica) of the present invention improves modulus of the rubber composition.

The present invention is described in detail below.

The first embodiment of the present invention provides a rubber composition comprising 100 parts by mass of the raw material rubber, 0.1 to 15% by mass of 2,4-dimercapto-6-substituted-1,3,5-triazine represented by the formula 1 and 1 to 100 parts by mass of a polymer having epoxy groups crosslinkable with the raw material rubber.

The second embodiment of the present invention characterized in that temperature in mixing the organic peroxide-crosslinkable raw material rubber composition is maintained at 140° C. or lower, thereby maintaining adhesion stability. The term "there is adhesion stability" used herein means that scatter of adhesiveness due to change in mixing conditions of the rubber composition, storage conditions of the rubber composition and the like are small.

The third embodiment of the present invention provides a hose wherein an inner tube and/or an outer cover comprise a rubber composition comprising the organic peroxide-crosslinkable raw material rubber, 2,4-dimecapto-6-substituted-1,3,5-triazine represented by the above formula 1, a polymer having organic peroxide-crosslinkable epoxy groups and organic peroxide.

The fourth embodiment of the present invention provides triallyl isocyanurate and/or triallyl cyanurate supported on silica, obtained by heat treating triallyl isocyanurate (TAIC) and/or triallyl cyanurate (TAC) in the presence of silica and a compounding agent for a rubber and an organic peroxide-crosslinkable rubber composition containing the compounding agent for a rubber.

The raw material rubber used in the first embodiment of the present invention may be either of organic peroxide-crosslinkable rubber and sulfur-crosslinkable rubber, and also may be either of diene rubber and non-diene rubber.

Examples of the diene rubber include natural rubber, isoprene rubber, chloroprene rubber, styrene-butadiene copolymer rubber, ethylene-propylene-diene copolymer rubber (EPDM), polybutadiene rubber (BR) (high cis-butadiene rubber, low cis-butadiene rubber), acrylonitrile-butadiene copolymer rubber (NBR), liquid polyisoprene, liquid polybutadiene, liquid 1,2-polybutadiene, liquid styrene-butadiene copolymer rubber and liquid polychloroprene. Those rubbers are generally crosslinked with sulfur, but can be crosslinked with organic peroxide. In the present invention those rubber can be used as the organic peroxide-crosslinkable raw material rubber and sulfur-crosslinkable raw material rubber.

Examples of the non-diene rubber include hydrogenated styrene-butadiene copolymer rubber (HSBR), ethylene-propylene copolymer rubber (EPM), ethylene-propylene-diene copolymer rubber (EPDM), maleic acid-modified ethylene-propylene copolymer rubber, ethylene-acrylic acid ester copolymer rubber (AEM) (e.g., ethylene-methyl acrylate copolymer rubber), ethylene-vinyl acetate copolymer rubber (EVM), acrylic rubber (ACM, ANM), halogen-containing rubber (e.g., brominated isobutylene-para-methylstyrene copolymer rubber (BIMS), hydrin rubber (ECO), chlorosulfonated polyethylene rubber (CSM), chlorinated polyethylene rubber (CM) and maleic acid-modified chlorinated polyethyelene), silicone rubber (e.g., methylvinyl silicone rubber and methylphenyl vinyl silicone rubber), sulfur-containing rubber (e.g., polysulfide rubber) and fluorine-containing rubber (e.g., vinylidene fluoride rubber, fluorine-containing vinyl ether rubber and fluorine-containing phosphagen rubber). Of those, ethylene-acrylic acid ester copolymer rubber (AEM), EPM and EPDM and the like are preferable. In many cases, those rubbers are crosslinked with organic peroxide, and are used as the organic peroxide-crosslinkable raw material rubber in the present invention (provided that some rubber, such as acrylic rubber and BIMS are organic peroxide-non-crosslinkable rubber).

Some hydrogenated acrylonitrile-butadiene copolymer rubber (HNBR), that is, a copolymer rubber having an iodine value of 15 or less, having in a polymer chain 10 to 45% by mass of a unit portion (Y portion; VCN) from an unsaturated nitrile, 0 to 5% by mass of a unit portion (Z portion; C=C) from a conjugated diene and 90 to 50% by mass of a unit portion (X portion; C—C) obtained by hydrogenating a unit portion from a unit portion from an ethylenically unsaturated monomer other than the unsaturated nitrile and/or a unit portion of the conjugated diene, are excluded from the rubber used in the first embodiment of the present invention.

Raw material rubber having epoxy groups, that have both characteristics of raw material rubber and the crosslinkable polymer having epoxy groups can be used in the first embodiment of the present invention. In the case that such rubber are used, the raw material rubber and/or crosslinkable polymer having epoxy groups can be omitted.

Examples of such raw material rubber include copolymer rubber obtained using a copolymerizable component having epoxy groups, graft copolymers wherein at least one of graft chains in the graft copolymer has epoxy groups, rubber obtained by epoxidizing unsaturated bonds in the main chain of diene rubber and combinations of those.

Examples of the copolymer rubber obtained using a copolymerizable component having epoxy groups include acrylic rubber having at least one of monomers having epoxy groups as a copolymerizable component, such as allyl glycidyl ether, glycidyl (meth)acrylate, 3,4-epoxyhexahydrobenzyl (meth)acrylate, 4-glycidyloxy-3,5-dimethylbenzyl (meth)acrylate, 2-(4'-glycidyloxyphenyl)-2-[4'-(meth)acryloxyethyloxyphenyl]propane, 2-(meth)acryloyloxyethyl succinic acid glycidyl ester, 2-(meth)acryloyloxyethyl phthalic acid glycidyl ester, 2-(meth)acryloyloxyethyl hexahydrophthalic acid glycidyl ester, 2-(meth)acryloyloxyethyl terephthalic acid glycidyl ester, 2-(meth)acryloyloxyethyl hexahydroterephthalic acid glycidyl ester, 3,4-epoxyhexahydrobenzyl (meth)acrylamide and 4-glycidyloxy-3,5-dimethylbenzyl (meth)acrylamide; and ethylene-acrylic acid ester copolymer rubber having, for example, glycidyl methacrylate (GMA) and glycidyl acrylate as a copolymerizable component (such as ethylene-acrylic acid ester-glycidyl methacrylate copolymer rubber, ethylene-acrylic acid ester-glycidyl methacrylate copolymer rubber and ethylene-acrylic acid ester-vinyl acetate-glycidyl methacrylate copolymer rubber).

Examples of the graft copolymer wherein at least one of graft chains in the graft copolymer has epoxy groups include copolymers obtained by graft copolymerizing glycidyl methacrylate (GMA) or the like onto EVA, AEM, EPM, ACM, BR or the like.

Examples of the rubber obtained by epoxidizing unsaturated bonds in the main chain of diene rubber include epoxidized natural rubber obtained by epoxidizing isoprene units in natural rubber in the proportion of preferably 25 to 75%.

The raw material rubber having epoxy groups can be used as either of organic peroxide-crosslinkable rubber, sulfur-crosslinkable rubber or rubber using other vulcanization systems, and are also used as either of diene rubber or non-diene rubber.

The second embodiment of the present invention uses the above-described diene or non-diene type organic peroxide-crosslinkable raw material rubber.

The organic peroxide-crosslinkable raw material rubber used in the third and four embodiments of the present invention are non-diene type organic peroxide crosslinkable raw material rubber. In particular, hydrogenated acrylonitrile-butadiene copolymer rubber (HNBR) and/or ethylene-acrylic acid ester copolymer rubber (AEM) are preferable from the point of heat resistance.

The hydrogenated acrylonitrile-butadiene copolymer rubber (HNBR) is copolymer rubber having, in the polymer chain, a unit portion from an unsaturated nitrile (Y portion; VCN), a unit portion from a conjugated diene (Z portion; C=C) and a unit portion from an ethylenically unsaturated monomer other than the unsaturated nitrile and/or a unit portion from the conjugated diene (X portion; C—C), and have an iodine value of 15 or lower.

The composition of HNBR is that the Y portion is 10 to 45% by mass, the Z portion is 0 to 5% by mass and the X portion is 90 to 50% by mass. If the Z portion exceeds 5% by mass, heat resistance of the rubber composition is insufficient.

The acrylic acid ester that constitutes a copolymer rubber (AEM) of ethylene and acrylic acid ester includes a methacrylic acid ester. Examples of the acrylic acid ester include methyl acrylate, methyl methacrylate, ethyl acrylate, ethyl methacrylate, butyl acrylate, butyl methacrylate, t-butyl acrylate, t-butyl methacrylate, 2-ethylhexyl acrylate and 2-ethylhexyl methacrylate.

The ethylene-acrylic acid ester copolymer rubber is a copolymer of ethylene and the above-described acrylic acid ester, and may further contain a crosslinkable monomer as a third copolymerizable component. Examples of such a rubber include ethylene-methyl acrylate copolymer rubber, ethylene-ethyl acrylate copolymer rubber and ethylene methyl methacrylate copolymer rubber. Of those, ethylene methyl acrylate copolymer rubber is preferable.

The composition of the ethylene acrylic acid ester copolymer rubber is not particularly limited, and falls within the range generally used. In other words, the ethylene-acrylic acid ester copolymer rubber may have any compositional proportion so long as the ethylene content therein is within the range that does not impair rubber elasticity and satisfy the characteristic such heat resistance, low temperature property and the like.

The 2,4-dimercapto-6-substituted-1,3,5-triazine represented by the formula 1 used in the present invention is that R in the formula is selected from the group consisting of mercapto group, alkoxyl group, monoalkylamino group, dialkylamino group, monocycloalkylamino group, dicycloalkylamino group and N-alkyl-N-arylamino group. Considering a bonding speed between a metal (for example, a brass-plated reinforcing steel wire for forming a reinforcing layer) and a polymer having epoxy group, that is, a timing of crosslinking reaction and adhesion reaction, 2,4,6-trimercapto-1,3,5-triazine wherein R is mercapto group is preferable. 2,4-Dimercapto-6-substituted-1,3,5-triazine represented by the formula 1 wherein Rs are two or more different groups may further be used in combination.

The content of 2,4,6-dimercapto-6-substituted-1,3,5-triazine represented by the formula 1 in the rubber composition of the present invention is 0.1 to 15 parts by mass per 100 parts by mass of the raw material rubber such as HNBR or AEM. If the content is less than 0.1 part by mass, adhesiveness between the rubber composition and the metal, for example, adhesiveness between an inner tube and/or an outer cover using the rubber composition and the reinforcing layer comprising the brass-plated reinforcing steel wire, may be insufficient. On the other hand, if the content exceeds 15 parts by mass, crosslinking may be impaired, resulting in decrease of modulus. In addition, if the content exceeds 15 parts by mass, reaction with the polymer having epoxy groups occurs frequently as described hereinafter. As a result, the proportion of the polymer having epoxy groups in the rubber composition, that bonds to the raw material rubber decreases. That is, of the polymer having epoxy groups in the rubber composition containing HNBR or the rubber composition containing AEM, the proportion of the polymer that bonds to HNBR or AEM decreases. Consequently, adhesiveness between the rubber composition and the metal, that is, adhesiveness between the inner tube and/or outer cover and the reinforcing layer, may be insufficient. 0.2 to 10 parts by mass is preferably.

The crosslinkable polymer having epoxy groups used in the rubber composition of the present invention is a polymer capable of crosslinking with the raw material rubber by organic peroxide or sulfur, and further is a polymer having epoxy groups. The epoxy resin such as bisphenol type produced from bisphenol and epichlorohydrin is that crosslinking by the organic peroxide or sulfur is difficult to occur. As a result, bonding proportion of such a resin to the raw material rubber is small, and adhesiveness between the rubber composition and the metal is insufficient. Therefore, epoxy resin such as bisphenol type is not included in the polymer having epoxy groups used in the present invention.

The polymer having the epoxy group may be any polymer reacting the raw material rubber by organic peroxide where the raw material rubber is an organic peroxide-crosslinkable raw material rubber, and may be any polymer crosslinking the raw material rubber by sulfur where the raw material rubber is a sulfur-crosslinkable raw material rubber. Considering adhesiveness between the rubber composition and the metal, preferred example of the polymer having epoxy groups is a graft copolymer wherein the main chain is capable of crosslinking, particularly organic peroxide-crosslinkable, with the raw material rubber, and at least one of graft chains has epoxy groups.

The main chain of the graft copolymer is preferably an ethylene polymer where the raw material rubber is an organic peroxide-crosslinkable raw material rubber, and a diene polymer where the raw material rubber is a sulfur-crosslinkable raw material rubber.

Examples of the ethylene polymer include low density polyethylene (LDPE), ethylene-vinyl acetate copolymer (EVA), ethylene-acrylic acid ester copolymer (for example, ethylene-methyl acrylate copolymer (EMA), ethylene-ethyl acrylate copolymer (EEA) and ethylene-methyl methacrylate copolymer (EMMA)), ethylene-propylene copolymer (EPM) and polypropylene (PP).

Examples of the diene polymer include polybutadiene rubber (BR) and polyisoprene rubber (IR).

The monomer of graft chain used is preferably glycidyl methacrylate (GMA) and the like.

The main chain and the graft chain may be obtained from one kind of monomer, respectively, or may be obtained from at least two kinds of monomers.

The graft copolymer has a structure that the graft chain is branched and bonded to the main chain. The main chain and the raw material rubber are crosslinked and also epoxy group which is the graft chain is reacted with 2,4-dimercapto-6-substituted-1,3,5-triazine represented by the formula 1, whereby the raw material rubber and the metal are adhered through the graft copolymer. For example, in the case of hose, it is considered that the raw material rubber is adhered with the reinforcing steel wire plated with brass for forming the reinforcing layer.

Suitable examples of the combination of the raw material rubber and the polymer having epoxy groups, that is the graft polymer include CM and EMA-g-GMA (a graft copolymer wherein the main chain is EMA and the graft chain is GMA), EPM and EPA-g-GMA, AEM and EMA-g-GMA, NBR and EMA-g-GMA, EPDM and EMA-g-GMA and NBR and BR-g-GMA (a graft copolymer wherein the main chain is BR and the graft chain is GMA).

If the raw material rubber is a rubber having epoxy groups, such as ethylene-acrylic acid ester-glycidyl methacrylate copolymer rubber, a polymer having epoxy groups may not additionally be used.

The crosslinkable polymer having epoxy groups used in the second to fourth embodiments of the present invention is a polymer capable of crosslinking with the raw material rubber by the organic peroxide.

In particular, considering adhesiveness between the inner tube and/or outer cover using the rubber composition containing HNBR or the rubber composition containing AEM and the reinforcing layer, the polymer having epoxy groups used in the rubber composition containing HNBR or the rubber composition containing AEM according to the third embodiment of the present invention is a graft copolymer wherein the main chain is an organic peroxide-crosslinkable polymer. The graft copolymer wherein at least one of the graft chains has epoxy groups is preferable. Glycidyl methacrylate or the like is suitably used as the monomer of the graft chain. The main chain of the graft copolymer is not particularly limited, but ethylene polymers are preferable. Examples of the ethylene polymer include low density polyethylene (LDPE), ethylene vinyl acetate copolymer resin (EVA), ethylene-acrylic acid ester copolymer (for example, EMA, EEA and EMMA) and ethylene-propylene copolymer (EPM). The graft chain and the main chain may be obtained from one kind of monomer, respectively, or may be obtained from at least two kinds of monomers.

Although depending on the amount of epoxy group and the like, the content of the polymer having epoxy groups in the rubber composition of the present invention is generally 1 to 100 parts by mass, and preferably 5 to 50 parts by mass, per 100 parts by mass of the raw material rubber. If the content is less than 1 part by mass, adhesiveness between the rubber composition and the metal may be insufficient. On the other hand, if the content exceeds 100 parts by mass, adhesiveness between the rubber composition and the metal a heat resistance of the rubber composition may lower. In the case of the hose according to the third embodiment of the present invention, adhesiveness between the inner tube and/or outer cover using the rubber composition containing HNBR or the rubber composition containing AEM and the reinforcing layer, and heat resistance of the rubber composition may lower. If the content is in a range of 5 to 50 parts by mass, balance of adhesiveness between the rubber composition and the metal, modulus (ex. stress at 100% elongation), permanent compression set resistance and heat resistance is further improved.

As described before, JP-A-55-125155 contains the description regarding a polymer composition comprising organic peroxide-crosslinkable polymer, 2,4-dimercapto-6-R-1,3,5-triazine, an epoxy resin and organic peroxide. However, this composition is limited to a chlorine-containing polymer such as chlorinated polyethylene, and the JP-A does not refer to adhesiveness of a chlorine-free polymer at all. In fact, the working examples of the JP-A use chlorinated polyethylene rubber and chlorosulfonated polyethylene rubber. Further, the JP-A does not refer to crosslinkability of an epoxy resin by an organic peroxide crosslinking, and in the examples thereof an epoxy resin having no organic peroxide crosslinkability is used. In other words, it is assumed that the epoxy resin is added with the expectation of the effect in adhesiveness to a metal by incorporating the epoxy resin between chlorine in the polymer and 2,4-dimercapto-6-R-1,3,5-triazine reacted with copper in brass, thereby causing crosslinking. Adhesion reaction by the same reaction mechanism with a chlorine-free polymer is not expected, and the epoxy group-containing polymer does not co-crosslink with a chlorine-free polymer, different from the present invention.

The present invention is based on the finding that adhesiveness is improved by using a polymer having epoxy groups crosslinkable with the raw material rubber, not a bisphenol-epichlorohydrin type epoxy resin which is generally considered to have large adhesiveness to a metal. The reason for this is not yet clarified, it is considered as follows. General bisphenol type epoxy resin has poor radical reactivity and pulling out hydrogen is difficult to occur. Further, since the bisphenol type epoxy resin does not have double bond other than aromatic ring in the main chain, crosslinking reaction is difficult to occur at the site other than epoxy group. Contrary to this, the polymer having epoxy groups used in the rubber composition of the present invention has high radical reactivity of methylene chain such as ethylene or has a portion which contributes to crosslinking reaction of double bond or the like other than aromatic ring, in the main chain. Therefore, bonding to the raw material rubber (for example, HNBR and AEM) effectively causes, and simultaneously 2,4-dimercapto-6-substituted-1,3,5-triazine bonds to a metal through mercapto group, thereby forming bonding to the polymer having epoxy groups by ring-opening reaction of epoxy group through other mercapto group in the same molecule.

In detail, bonding between the raw material rubber (for example, HNBR and AEM) and the polymer having epoxy groups, bonding between the polymer having epoxy groups and 2,4-dimercapto-6-substituted-1,3,5-triazine represented by the formula 1 and bonding between 2,4-dimercapto-6-substituted-1,3,5-triazine represented by the formula 1 and copper in the metal simultaneously occur. As a result, the rubber composition of the present invention and the metal are bonded to form an integral structure. Further, some polymers having epoxy groups react with a metal, thereby bonding the same. If such a polymer having epoxy groups is selected, bonding between the rubber composition of the present invention and a metal is further strong.

Further, the composition disclosed in the above-described JP-A differs from the composition of the present invention in functional mechanism in co-crosslinking reaction, as compared with adhesion reaction between the epoxy group-containing polymer and a chlorine-containing polymer in the case of using the chlorine-containing polymer such as chlorinated polyethylene rubber or chlorosulfonated polyethylene rubber in the composition of the present invention.

Where the raw material rubber having epoxy groups is used, 2,4-dimercapto-6-substituted-1,3,5-triazine bonds to a metal through mercapto group, and bonds to the raw material rubber having epoxy groups through other mercapto group in the same molecule. Specifically, both bonding occurs simultaneously, and the rubber composition and the metal are integrally bonded.

Further, in the raw material rubber having epoxy groups, some rubber react with a metal, thereby bonding thereto. In this case, the rubber composition and the metal are further strongly bonded.

The rubber composition of the present invention preferably contains organic peroxide as a crosslinking agent where the raw material rubber is an organic peroxide-crosslinkable raw material rubber, and contains sulfur as a crosslinking agent where the raw material rubber is a sulfur-crosslinkable raw material rubber.

The organic peroxide is not particularly limited so long as it is generally used in rubber crosslinking, but organic peroxide wherein crosslinking does not extremely proceed at a processing temperature in the rubber composition is preferable. Dialkyl peroxide having a decomposition temperature (temperature at which a half-life period is 10 hours) of 80° C. or high is preferably used. Examples of the such organic peroxide include dicumyl peroxide, di-t-butyl peroxide, 1,3,-bis-(t-butylperoxyisopropyl)benzene, n-butyl 4,4'-di-(t-butylperoxy)valerate and 2,5-dimethyl-2,5-di-(t-butylperoxy)hexane.

The content of the organic peroxide in the rubber composition is preferably 1 to 10 parts by mass per 100 parts by mass of the raw material rubber. If the content is less than 1 part by mass, crosslinking density decreases and modulus and the like may be impaired. On the other hand, if the content exceeds 10 parts by mass, crosslinking density increases and elongation at break may lower. If the content falls within the above range, the crosslinking density is appropriate, with the result that modulus and elongation at break are good.

Sulfur is not particularly limited so long as it is generally used in rubber crosslinking, and examples thereof include powdery sulfur, precipitated sulfur, colloidal sulfur, insoluble sulfur and highly dispersible sulfur.

The content of sulfur in the rubber composition is preferably 0.1 to 30 parts by mass, and more preferably 0.5 to 5 parts by mass, per 100 parts by mass of the raw material rubber. If the content is less than 0.1 part by mass, crosslinking density decreases and modulus and the like may be impaired. On the other hand, if the content exceeds 30 parts by mass, crosslinking density increases and elongation at break may lower.

In the rubber composition according to the first embodiment of the present invention, when a rubber having epoxy groups is used as the raw material rubber, if the rubber is an organic peroxide-crosslinkable rubber, it is preferable to use an organic peroxide-crosslinkable rubber; if the rubber having epoxy groups is a sulfur-crosslinkable rubber, it is preferable to use sulfur; and if the rubber is a rubber crosslinkable with other vulcanization system, it is preferable to use the corresponding vulcanization system.

The respective content is the same as in the case of using the rubber containing no epoxy group as described above. Further, if there is an appropriate vulcanization system for the raw material rubber such as acrylic rubber, it is preferable to contain such an appropriate vulcanization system in an appropriate amount.

If required and necessary, the rubber composition of the present invention can contain, in addition to the above-described components, additives such as crosslinking aids, reinforcing agents (carbon black), fillers, antioxidants, processing aids, plasticizers and softening agents, in the range of not impairing adhesiveness to a metal, modulus, permanent compression set and heat resistance.

In the case of using the organic peroxide as a crosslinking agent, if triallyl sicyanurate and/or triallyl cyanurate are compounded as a crosslinking aid, modulus and adhesiveness to a metal are improved, which is preferable.

TAIC and TAC are a trifunctional polymerizable monomer, and use of those in the rubber composition of the present invention can increase crosslinking density, thereby improving modulus.

The content of TAIC and/or TAC in the rubber composition is preferably 0.1 to 30 parts by mass per 100 parts by mass of the raw material rubber, although varying depending on the content of epoxy groups in the polymer having epoxy groups.

Examples of the filler include silica (white carbon), calcium carbonate, barium sulfate, talc, and clay and titanium oxide. Of those, silica is preferable. Silica is acidic compounding agent and therefore effectively contributes to adjust the reaction rate of 2,4-dimercapto-6-substituted-1,3,5-triazine represented by the formula 1, thereby stabilizing physical properties and adhesiveness.

Silica (white carbon) is not particularly limited, and examples thereof include dry method white carbon used as a filler for rubber, wet method white carbon, colloidal silica and precipitated silica as described in JP-A-62-62838. Of those, wet method white carbon comprising hydrous silicic acid as the main component is preferable. The hydrous silicic acid which is the main component of the wet method white carbon has a nitrogen adsorption specific surface area (BET method) of 50 to 400 $m^2/g$, and preferably 100 to 250 $m^2/g$ Further, the hydrous silicic acid has a pH (hydrogen ion concentration) of preferably less than 7.0, and more preferably 6.7 or lower. If the pH is within the above range, a premature reaction of 2,4-dimercapto-6-substituted-1,3,5-triazine can be suppressed. The nitrogen adsorption specific surface area is a value measured with BET method according to ASTM D3037 81, and the pH is a value obtained by introducing silica into water, stirring the mixture, filtering off and then measuring the filtrate with a pH meter.

The content of silica in the rubber composition according to the first embodiment of the present invention is generally 1 to 50 parts by mass, and preferably 2 to 50 parts by mass, per 100 parts by mass of the raw material rubber, although varying depending on the content of epoxy groups in the polymer having epoxy groups, or the like.

Triallyl isocyanurate (TIAC) and/or triallyl cyanurate (TAC) and silica exhibit the respective effect even if separately compounded with the raw material rubber. However, it is particularly preferable to compound those in the form of TAIC and/or TAC (solidified) supported on silica, that is obtained by heat treating a mixture containing TAIC and/or TAC and silica. This solidified product is that oligomers of mainly TAIC and/or TAC are present on the surface of a silica in an amount of preferably 30 to 80% by mass, and more preferably 50 to 70% by mass.

If the content of TAIC and/or TAC is less than 30% by mass, when those are used in the rubber composition containing non-diene polymer, particularly a polymer wherein the main chain is a methylene chain, crosslinked with an organic peroxide, the degree of improvement effect of modulus lowers. On the other hand, if the content exceeds 80% by mass, heat treatment time up to completion of solidification prolongs. Further, where those are used in the rubber composition in such an amount, it is difficult to exhibit sufficient improvement effect of modulus. The content fallen within a range of 50 to 70% by mass facilitates dispersion in mixing.

The content of the solidified product is 0.5 part by mass or more per 100 parts by mass of the raw material rubber. The solidified product is granular and shows an appropriate hydrophobicity. Therefore, the product can be used as a compounding agent for not only rubber but also resins and other materials.

The details of formation and components of the solidified product are unknown, but it is considered as follows. Part of TAIC and/or TAC which are polymerizable monomer undergo polymerization reaction by heat treatment on the surface of silica particles by the action of hydroxyl group or the like present on the silica particle surface as a catalyst, thereby forming a solidified product.

Heat treatment conditions may be any conditions so long as TAIC and/or TAC polymerizes on the surface of silica and fix to the surface of the silica. The heat treatment is conducted at a temperature of preferably 150° C. or higher, and more preferably 160 to 200° C., for preferably 10 minutes or longer, and more preferably 30 minutes to 24 hours, in air.

The solidified product can improve modulus while maintaining high heat resistance when compounded with the raw material rubber crosslinked with organic peroxide, particularly the rubber composition containing a polymer in which the main chain is a methylene chain. Further, handling property as a compounding agent is good, and this makes it easy to mix with the raw material rubber. Therefore, the solidified product is sufficiently effective even if compounded with a rubber composition which does not contain a polymer having epoxy groups and 2,4-dimercapto-6-substituted-1,3,5-triazine represented by the formula 1.

The solidified product is such that TAIC and/or TAC localize on the surface of silica, and therefore, self-curing is difficult to occur. As a result, the solidified product firmly bonds to silica by the curing of TAIC and/or TAC and a large amount of TAIC and/or TAC does not contact each other and therefore those do not polymerize. Even if the solidified product is added to the raw material rubber in large amount, it is difficult to cause loss of heat resistance or decrease in breaking strength such as tear strength or tensile strength, due to self-curing.

Further, it is considered as follows. TAIC and/or TAC localized on the surface of silica act as a crosslinking aid to co-crosslink with the polymer in which the main chain is a methylene chain. As a result, this brings about a firm bonding between the polymer and silica, and thus reinforcing effect of silica is enhanced.

Therefore, if a large amount of the solidified product is used in the rubber composition containing a polymer in which the main chain is a methylene chain, crosslinked with organic peroxide, high modulus is achieved without impairing heat resistance.

Further, since the solidified product does not self-cure, the improvement effect of modulus of the raw material rubber per the compounding amount is large. In other words, the compounding efficiency is high as compared with the use of TAIC and/or TAC alone.

The antioxidant is heat-resistant antioxidant, weather resistant antioxidant or the like and is not particularly limited so long as it is generally used in rubber compositions. Examples of the antioxidant include amine type antioxidants such as naphthylamine type (phenyl-α-naphthylamine and the like), diphenylamine type (octylated diphenylamine, 4,4'-bis(α,α'-dimethylbenzyl) diphenylamine and the like) and p-phenylenediamine type (N-isopropyl-N'-phenyl-p-phenylenediamine, N-(1,3-dimethylbutyl)-N'-phenyl-p-phenylenediamine, N,N'-di-2-naphthyl-p-phenylenediamine and the like); quinoline type antioxidants such as polymer of 2,2,4-trimethyl-1,2-dihydroquinoline; and phenol type antioxidants such as monophenol type (2,6-di-t-butyl-4-methylphenol, styrenated phenol and the like) and bis-, tris-, polyphenol type (tetrakis-[methylene-3-(3',5'-di-t-butyl-4'-hydroxyphenyl) propionate] methane and the like).

Examples of the softening agent include process oils such as paraffin type, naphthene type, aroma type; vegetable oils such as castor oil, cottonseed oil, linseed oil, rapeseed oil, soybean oil or palm oil; and rosin oils.

Examples of the plasticizer are synthetic plasticizers such as phthalic acid ester type (diethyl phthalate, dibutyl phthalate, di-(2-ethylhexyl)phthalate, di-n-octyl phthalate or the like); adipic acid ester type (di-(2-ethylhexyl)adipate, di-(butoxyethoxyethyl)adipate or the like); and trimellitic acid ester type (tri-(2-ethylhexyl)trimellitate or the like).

The rubber composition of the present invention is produced by maintaining a temperature of a mixture at 140° C. or lower, and preferably 130° C. or lower, through the overall steps of from mixing the raw material rubber with at least one of the remaining components to mixing all the components. If the temperature exceeds 140° C., ring-opening reaction of epoxy group in the polymer having epoxy groups tends to occur, and for example, reaction with mercapto group in 2,4-dimercapto-6-substituted-1,3,5-triazine represented by the formula 1 occurs. As a result, adhesiveness to a metal after crosslinking is unstable.

Further, in the production process of the rubber composition of the present invention, it is particularly preferable to maintain the temperature of the composition in the steps after addition of 2,4-dimercapto-6-substituted-1,3,5-triazine represented by the formula 1 at 100° C. or lower. If the temperature exceeds 100° C., the 2,4-dimercapto-6-substituted-1,3,5-triazine strongly acts as a ring-opening catalyst of epoxy group, which makes adhesion between the rubber composition after crosslinking and a metal unstable and loses the effect of adhesion (no adhesion stability). As a result, physical properties such as modulus and the like of the rubber composition after crosslinking are lowered.

The production process of the rubber composition according to the present invention is sufficient if the temperature is adjusted as described above, and is not particularly limited by the mixing order, the number of mixing and mixing time of the essential components and optional components of the rubber composition, the type of a mixing machine used, and the like. Further, the mixing steps may be divided into plural steps.

The temperature adjustment method is not particularly limited. The rubber composition generates heat in mixing. Therefore, in order to adjust the temperature while suppressing the generated heat, the amount of the rubber composition charged could be decreased or mixing can be conducted while cooling the mixing machine.

Further, it is preferable that the mixing step is divided into 2 to 10 steps, the rubber composition is discharged prior to reaching the temperature to the upper limit thereof, and after gradually cooling, the next step is conducted to adjust the temperature. The number of steps of the mixing steps divided is preferably 2 to 5 steps, and 2 steps are more preferable from the point that working is not particularly complicated. Those steps may appropriately be combined to adjust the temperature.

The mixing machine used includes a closed type mixing machine, an open type kneading roller or a continuous mixer. Examples of the closed type mixing machine include Banbury mixer, intermixer and kneader. Of those, Banbury mixer is preferable.

The preferred embodiments of the production process of the rubber composition according to the present invention are described below, the invention is not limited thereto.

Step 1:
(1) 100 Parts by mass of the organic peroxide-crosslinkable raw material rubber are introduced into Banbury mixer, and mixing is initiated.
(2) Within 1 minute, 1 to 100 parts by mass of the organic peroxide-crosslinkable polymer having epoxy groups are introduced.
(3) Within 2 minutes after the mixing of the rubber, an appropriate amount of various additives as optional components and 0.1 to 15 parts by mass of 2,4-dimercapto-6-substituted-1,3,5-triazine represented by the formula 1 are introduced.
(4) Within 5 minutes after the mixing of the rubber, crosslinking aids as optional components (diallyl phthalate, triallyl isocyanuarate and/or triallyl cyanurate) are introduced.
(5) After 2 to 10 minutes from the time of the mixing of the rubber, a ram of Banbury mixer is moved up and down to turn reverse the rubber composition.
(6) After 3 to 15 minutes from the time of the mixing of the rubber, when the temperature of the rubber composition reached about 130 to 140° C., the rubber composition is discharged to complete Step Step 2:
(7) The rubber composition obtained in Step 1 is allowed to stand for cooling, and the rubber composition is then introduced in Banbury mixer together with 1 to 10 parts by mass of organic peroxide to initiate mixing.
(8) After 5 seconds to 5 minutes, when the temperature of the rubber composition reached about 80 to 100° C., the rubber composition is discharged to complete Step 2.

Other preferred embodiments are shown below. In the production process shown below, the temperature of the rubber composition in the steps after adding 2,4-dimercapto-6-substituted-1,3,5-triazine represented by the formula 1 is maintained at 100° C. or lower.

Step 1:
(1) 100 Parts by mass of the organic peroxide-crosslinkable raw material rubber are introduced into Banbury mixer, and mixing is initiated.
(2) Within 1 minute, 1 to 100 parts by mass of the organic peroxide-crosslinkable polymer having epoxy groups are introduced.
(3) Within 2 minutes after the mixing of the rubber, an appropriate amount of various additives as optional components are introduced.
(4) Within 5 minutes after the mixing of the rubber, crosslinking aids as optional components (diallyl phthalate, triallyl isocyanuarate and/or triallyl cyanurate) are introduced.
(5) After 2 to 10 minutes from the time of the mixing of the rubber, a ram of Banbury mixer is moved up and down to turn reverse the rubber composition.
(6) After 3 to 15 minutes from the time of the mixing of the rubber, when the temperature of the rubber composition reached about 130 to 140° C., the rubber composition is discharged to complete Step 1.

Step 2:
(7) The rubber composition obtained in Step 1 is allowed to stand for cooling, and the rubber composition is then introduced in Banbury mixer together with 0.1 to 15 parts by mass of 2,4-dimercapto-6-substituted-1,3,5-triazine represented by the formula 1 and 1 to 10 parts by mass of an organic peroxide to initiate mixing.
(8) After 5 seconds to 5 minutes, when the temperature of the rubber composition reached about 80 to 100° C., the rubber composition is discharged to complete Step 2.

The rubber composition obtained by the production process of the present invention exhibits adhesion stability to a metal. Further, since the rubber composition has high adhesiveness to a metal, high modulus, compression set resistance and high heat resistance, it can be used in wide uses such as hoses, belts, tires, rolls and mold goods, which are related to a composite product of a rubber and a metal. In particular, since the rubber composition has high adhesiveness to copper or an alloy containing copper, it can extremely suitably used in composite rubber products of brass, bronze-plated steel plate or reinforcing steel wire.

The third embodiment of the present invention provides a hose comprising a reinforcing layer comprising brass-plated reinforcing steel wires and inner tube and/or outer cover, wherein the inner tube and/or outer cover comprise the rubber composition of the present invention.

In the hose, the first aspect of the present invention is that the inner tube and/or outer cover comprise the rubber composition containing HNBR, the second aspect of the present invention is that the inner tube and/or outer cover comprise the rubber composition containing AEM and the third aspect is that the inner tube comprises the rubber composition containing HNBR and the outer cover comprises the rubber composition containing AEM.

The rein forcing layer in the hose of the present invention is that plaiting in blade form, spiral form or the like forms the brass-plated reinforcing steel wires.

The reinforcing steel wires are not particularly limited so long as the surface thereof is plated with brass, and wires generally used as hose wires can be used. The wires preferably used are, for example, high carbon steel wires having carbon content of 0.70 to 1.10% by mass and a wire diameter of 0.2 to 0.8 mm.

The particularly preferred aspect in the third embodiment of the present invention is that the inner tube comprises the rubber Composition containing HNBR and the outer cover comprises the rubber composition containing AEM.

The HNBR used in the rubber composition containing HNBR has the characteristics that heat resistance and oil resistance are excellent and modulus (ex. stress at 100% elongation) is high, and the AEM (ethylene-acrylic acid ester copolymer rubber) used in the rubber composition containing AEM has the characteristics that heat resistance and weather resistance are excellent. Therefore, the hose according to the third aspect in the third embodiment of the present invention is particularly useful in that the inner tube has excellent heat resistance and oil resistance, the outer cover has excellent heat resistance and weather resistance and adhesiveness between the inner tube and the outer cover is excellent.

The hose according the third embodiment of the present invention is explained in the case of the hose which comprises a single layer of a reinforcing layer comprising brass-plated reinforcing steel wires, a single layer of an inner tube and a single layer of an outer cover, but the hose according to the third embodiment of the present invention is not limited to the above embodiment, and the reinforcing layer, the inner tube and the outer cover may be amultilayer, respectively. In this case, in the first aspect and the second aspect in the third embodiment of the present invention, of a plurality of layers forming the inner tube and/or outer cover, at least one layer closely adhered to the reinforcing layer may comprise the rubber composition containing HNBR or the rubber composition containing AEM. Further, in the third aspect in the third embodiment of the present invention, it is preferable that the structure is as above, the innermost layer of the inner tube comprises the rubber composition containing HNBR and the outermost layer of the outer cover comprises the rubber composition containing AEM.

The inner diameter and the outer diameter of the hose are not particularly limited.

The thickness of the inner tube of the hose is not particularly limited, but is preferably 0.8 to 3.0 mm. Further, the thickness of the layer that is one layer of the inner tube of the hose and is constituted of the rubber composition containing HNBR is preferably 0.8 to 2.5 mm, and more preferably 0.8 to 2.0 mm.

The thickness of the outer cover of the hose is not particularly limited, but is preferably 0.5 to 3.0 mm. Further, the thickness of the layer that is one layer of the outer cover of the hose and is constituted of the rubber composition containing AEM is preferably 0.5 to 2.5 mm, and more preferably 0.5 to 2.0 mm.

The production process of the hose according to the third embodiment of the present invention is not particularly limited, and conventional production processes of hose can be employed.

For example, the rubber composition containing unvulcanized HNBR or the rubber composition containing AEM is extruded from an extruder on a mandrel previously coated with a release agent to form an inner tube. Brass-plated reinforcing steel wires are braided on the inner tube using a braiding machine. If desired and necessary, after applying an adhesive to the reinforcing layer, the rubber composition containing HNBR or the rubber composition containing AEM is extruded from an extruder to form an outer cover. Pressure is applied directly or by covering the hose using, for example, a tape, and vulcanization is then conducted under pressure. Finally, the mandrel is pulled out, thereby obtaining a hose.

The hose according to the third embodiment of the present invention is a hose such that the reinforcing layer comprises brass-plated reinforcing steel wires, and HNBR or AEM is used as the inner tube material and the like. The hose has excellent adhesiveness between the inner tube or the like and the reinforcing layer, excellent heat resistance, sufficient modulus and suficient set resistance. Therefore, the hose is suitably used in wide uses, particularly oil pressure hose, hot water hose, steam hose and the like.

The present invention is described in more detail by reference to the following examples, but it should be understood that the invention is not construed as being limited thereto.

Preparation of Rubber Composition

Using the following components in the mass proportion shown in Tables 1(a) to 1(d), rubber compositions were prepared with Banbury mixer.

(1) Raw Material Rubber
 1) CM (chlorinated polyethylene): "ELASRENE 301A", a product of Showa Denko K.K.
 2) EPM (ethylene-propylene copolymer rubber): "JSR EP11", a product of Japan Synthetic Rubber Co., Ltd.
 3) AEM (ethylene-acrylic acid ester-acrylic acid copolymer rubber): "VAMAC G", a product of Du Pont-Mitsui Polychemicals Co., Ltd.
 4) AEM (ethylene-acrylic acid ester copolymer rubber): "ESPRENE EMA-2152", a product of Sumitomo Chemical Co., Ltd.
 5) NBR (acrylonitrile-butadiene copolymer rubber): "Nipol 1042AL", a product of Nippon Zeon Co., Ltd.
 6) EPDM (ethylene-propylene-diene copolymer rubber): "Mitsui EPT 4070", a product of Mitsui Chemicals, Inc.

(2) Raw Material Rubber Having Epoxy Group
 1) ACM (ACM having a copolymerizable component having epoxy groups): "AR 31", a product of Nippon Zeon Co., Ltd.
 2) AEM (ethylene-acrylic acid ester-glycidyl methacrylate copolymer rubber) "ESPRENE EMA-2752", a product of Sumitomo Chemical Co., Ltd.

(3) Polymer Having Epoxy Group
 1) BR-g-GMA (polybutadiene rubber obtained by graft polymerizing GMA)
 2) E-MA-GMA (copolymer of ethylene-methyl acrylate-GMA): "BONDFAST 7L", a product of Sumitomo Chemical Co., Ltd.
 3) ACM (ACM having copolymerizable component having epoxy groups): "AR31", a product of Nippon Zeon Co., Ltd.

(4) Compounding Agent
 SRF grade carbon black: "ASAHI #50", a product of Asahi Carbon Co., Ltd.
 Silica ($SiO_2$): "NIPSIL VN3", a product of Nippon Silica Industrial Co., Ltd.
 Zinc oxide (ZnO)
 Stearic acid
 Antioxidant
  1) "NON-FLEX OD-3", a product of Seiko Chemical Co., Ltd.
  2) "NOCRAC MBZ", a product of Ouchi-Shinko Chemical Industrial Co., Ltd.
 Wax: "SAN WAX 171P", a product of Sanyo Chemical Industries, Ltd.
 2,4,6-Trimercapto-1,3,5-triazine: "ZISNET-F", a product of Sankyo Chemical Industries, Ltd.
 Triallyl isocyanurate (TAIC)
 Diallyl phthalate (DAP)

(5) Crosslinking Agent
  1) 1,3-Bis-(t-butylperoxyisopropyl)benzene: "PARKA-DOX 14/40" (40 mass % product), a product of Kayaku Akzo Corporation
  2) Sulfur
(6) Crosslinking Accelerator
  1) Methylene dianiline (MDA)
  2) Di-o-tollyl guanadine (DT)
  3) Tetramethylthiuram disulfide (TT)
  4) Tetramethylthiuram monosulfide (TS)
  5) N-cyclohexyl-2-benzothiazylsulfen amide (CZ)
  6) Isocyanuric acid
  7) Octadecyltrimethyl ammonium bromide
  8) Diphenyl urea

EXAMPLES 1 TO 21 AND COMPARATIVE EXAMPLES 1 TO 4

Step 1:
  (1) Raw material rubber and a polymer having epoxy group were introduced into Banbury mixer, and mixing was initiated.
  (2) After 1 minute, compounding agents (carbon black, silica, zinc oxide, stearic acid, "NOCRAC MBZ", "SANWAX 171P" and 2,4,6-trimercapto-1,3,5-triazine "ZISNET-F") were further introduced.
  (3) When the temperature of the rubber composition reached about 110° C., triallyl isocyanurate and diallyl phthalate were further introduced.
  (4) Thereafter, a ram of Banbury mixer was moved up and down to turn reverse the rubber composition.
  (5) When the temperature of the rubber composition reached about 130° C., the rubber composition was discharged, thereby completing Step 1.

Step 2:
  (6) The rubber composition obtained in Step 1 was allowed to stand for cooling, and the rubber composition was introduced into Banbury mixer together with a crosslinking agent (organic peroxide), and mixing was again initiated.
  (7) When the temperature of the rubber composition reached about 100° C., the rubber composition was discharged, thereby completing Step 2.

Following tests were conducted on the rubber compositions obtained above. The results obtained are shown in Tables 1(a) to 1(d).

Adhesiveness Test

Adhesiveness test was conducted according to the definition of JIS K6256 "Adhesive testing methods for vulcanized rubber 5.0; 90° peeling test of metal piece and vulcanized rubber".

Each rubber composition obtained was molded into a sheet having a thickness of 2.5 mm by rolls for laboratory, the sheet was combined with a brass plate and the assembly was pressed. However, cellophane sheet was arranged on the gripping portion by chuck at the time of peeling so that the upper and lower layers were not adhered each other. Thereafter, the laminate was vulcanized at 160° C. for 60 minutes under a face pressure of 3.0 MPa using a press molding machine for laboratory to integrally bond, thereby obtaining a test piece that is a composite of brass and rubber. The test piece was allowed to stand at room temperature for 24 hours and then cut in 2.54 mm width, and peeling test in which the rubber composition and brass were peeled was conducted. Measurement of peel strength was conducted under the condition of tensile speed of 50 mm/min using a tensile tester defined in JIS K6256 according to the definition of JIS K6256 "90° peeling test of metal piece and vulcanized rubber". When the value of peel strength was 150 N/25 mm or more, it was evaluated that adhesiveness is good.

Tensile Stress at 100% Elongation (Modulus) Test

Each rubber composition obtained was vulcanized at 160° C. for 60 minutes under pressure and molded into a sheet having a thickness of 2 mm. Dumbbell No.3 form test piece was punched out from this sheet according to the definition of JIS K6251, and measurement of 100% modulus ($M_{100}$) was conducted according to the definition of JIS K6251. When the value of 100% modulus ($M_{100}$) was 9.0 MPa or more, it was evaluated to be good. 100% modulus ($M_{100}$) is the stress when the test piece was elongated at 100%.

Compression Set Test

Each rubber composition obtained was vulcanized at 160° C. for 60 minutes under pressure, and a large-sized test piece as defined in JIS K6262, 5.3.1 was molded according to the definition of JIS K6262 "Permanent set testing method for rubber, vulcanized rubber or thermoplastic", item 5 "Compression set testing method". 25% compression was applied to this test piece according to the definition of JIS K6262 "Permanent set testing method for rubber, vulcanized or thermoplastic", and compression set was measured under aging conditions of 150° C. and 72 hours. When the value of compression set was 60% or less, it was evaluated that composition set resistance is good.

Heat Resistance Test

Each rubber composition obtained was vulcanized at 160° C. for 60 minutes under pressure and molded into a sheet having a thickness of 2 mm. Dumbbell No.3 form test piece was punched out from this sheet according to the definition of JIS K6257 "Accelerated aging test methods for vulcanized rubber", item 4 "Air aging test (normal oven method)", and air aging treatment was conducted under the conditions of 150° C. and 168 hours according to the definition of JIS K6257. Elongation at break before and after the treatment was measured and the rate of change ($\Delta E_g$) of elongation at break by the treatment was calculated. When the value of the rate of change ($\Delta E_B$) of elongation at break was −50% or more, it was evaluated that heat resistance is good.

Table 1 (c)

| | | Example 9 | Example 10 | Example 11 | Example 12 | Example 13 | Example 14 | Example 15 | Example 16 |
|---|---|---|---|---|---|---|---|---|---|
| Rubber Composition | Raw material rubber | | | | | | | | |
| | CM | | | | | | | | |
| | EPM | | | | | | | | |
| | AEM ("VAMAC G") | | | | | | | | |
| | AEM ("ESPRENE EMA 2152") | 100.0 | 100.0 | 100.0 | 100.0 | 100.0 | 100.0 | 100.0 | 100.0 |
| | Polymer having epoxy group | | | | | | | | |
| | E-MA-GMA | 50.0 | 100.0 | 20.0 | 20.0 | 20.0 | 20.0 | 20.0 | 20.0 |
| | ACM {"AR 31"} | | | | | | | | |
| | Compounding agent | | | | | | | | |
| | SRF grade carbon black | 95.0 | 95.0 | 95.0 | 95.0 | 95.0 | 95.0 | 95.0 | 95.0 |
| | Silica | | | | 5.0 | 10.0 | | 5.0 | 10.0 |
| | Zinc oxide | 2.0 | 2.0 | 2.0 | 2.0 | 2.0 | 2.0 | 2.0 | 2.0 |
| | Stearic acid | 1.0 | 1.0 | 1.0 | 1.0 | 1.0 | 1.0 | 1.0 | 1.0 |
| | "NOCRAC MBZ" | 1.5 | 1.5 | 1.5 | 1.5 | 1.5 | 1.5 | 1.5 | 1.5 |
| | Wax | 1.0 | 1.0 | 1.0 | 1.0 | 1.0 | 1.0 | 1.0 | 1.0 |
| | "ZISNET-F" | 1.0 | 1.0 | 1.0 | 1.0 | 1.0 | 1.0 | 1.0 | 1.0 |
| | TAIC | 2.0 | 2.0 | 4.0 | 4.0 | 4.0 | 8.0 | 8.0 | 8.0 |
| | DAP | 7.0 | 7.0 | 7.0 | 7.0 | 7.0 | 7.0 | 7.0 | 7.0 |
| | Crosslinking agent/accelerator | | | | | | | | |
| | "PARKADOX 14/40" | 7.5 | 7.5 | 7.5 | 7.5 | 7.5 | 7.5 | 7.5 | 7.5 |
| | MDA | | | | | | | | |
| | DT | | | | | | | | |
| Physical Properties | Adhesiveness: brass Peel strength (N/25 mm) | 220 | 200 | 250 | 270 | 280 | 250 | 270 | 280 |
| | Modulus $M_{100}$ (MPa) | 11.0 | 13.0 | 11.1 | 11.5 | 11.8 | 11.6 | 12.0 | 12.3 |
| | Compression set resistance: 150° C. × 72 h Permanent compression deformation (%) | 55 | 58 | 46 | 47 | 47 | 43 | 44 | 44 |
| | Heat resistance: 150° C. × 168 h air aging $\Delta E_B$ (%) | −31 | −33 | −29 | −29 | −30 | −28 | −28 | −30 |

Table 1 (d)

| | | Comparative Example 9 | Comparative Example 10 | Example 17 | Comparative Example 11 | Comparative Example 12 | Example 18 |
|---|---|---|---|---|---|---|---|
| Rubber Composition | Raw material rubber | | | | | | |
| | NBR | 100.0 | 100.0 | 100.0 | 100.0 | 100.0 | 100.0 |
| | EPDM | | | | | | |
| | Polymer having epoxy group | | | | | | |
| | BR-g-GMA | | | 10.0 | | | |
| | E-MA-GMA | | | | | | 20.0 |
| | Compounding agent | | | | | | |
| | SRF grade carbon black | 95.0 | 95.0 | 95.0 | 95.0 | 95.0 | 95.0 |
| | Silica | | | | | | |
| | Zinc oxide | 5.0 | 5.0 | 5.0 | 5.0 | 5.0 | 5.0 |
| | Stearic acid | 1.0 | 1.0 | 1.0 | 1.0 | 1.0 | 1.0 |
| | "NONFREX OD-3" | 1.0 | 1.0 | 1.0 | | | |
| | "NOCRAC MBZ" | | | | 1.5 | 1.5 | 1.5 |
| | Wax | | | | 1.0 | | |
| | "ZISNET-F" | | 1.0 | 1.0 | | 1.0 | 1.0 |
| | TAIC | | | | 2.0 | 2.0 | 2.0 |
| | DAP | | | | 7.0 | 7.0 | 7.0 |
| | Crosslinking agent/accelerator | | | | | | |
| | Sulfur | 1.0 | 1.0 | 1.0 | | | |
| | TT | 1.0 | | | | | |
| | TS | | 1.0 | 1.0 | | | |
| | CZ | 1.0 | | | | | |
| | "PARKADOX 14/40" | | | | 5.0 | 5.0 | 5.0 |
| Physical Properties | Adhesiveness: brass Peel strength (N/25 mm) | 10 | 150 | 180 | 5 | 150 | 180 |
| | Modulus $M_{100}$ (MPa) | 9.2 | 9.0 | 9.5 | 9.2 | 8.5 | 9.2 |
| | Compression set resistance: | 40 | 55 | 45 | 33 | 55 | 35 |

-continued

|  |  |  |  |  |  |  |
|---|---|---|---|---|---|---|
| 150° C. × 72 h Permanent compression deformation (%) |  |  |  |  |  |  |
| Heat resistance: 150° C. × 168 h air aging ΔE$_B$ (%) | −25 | −40 | −30 | −25 | −40 | −25 |

Table 1 (d)

|  |  | Example 19 | Comparative Example 13 | Comparative Example 14 | Example 20 | Example 21 |
|---|---|---|---|---|---|---|
| Rubber Composition | Raw material rubber |  |  |  |  |  |
|  | NBR | 100.0 |  |  |  |  |
|  | EPDM |  | 100.0 | 100.0 | 100.0 | 100.0 |
|  | Polymer having epoxy group |  |  |  |  |  |
|  | BR-g-GMA |  |  |  |  |  |
|  | E-MA-GMA | 20.0 |  |  | 20.0 | 20.0 |
|  | Compounding agent |  |  |  |  |  |
|  | SRF grade carbon black | 95.0 | 95.0 | 95.0 | 95.0 | 95.0 |
|  | Silica | 5.0 |  |  |  | 5.0 |
|  | Zinc oxide | 5.0 | 2.0 | 2.0 | 2.0 | 2.0 |
|  | Stearic acid | 1.0 | 1.0 | 1.0 | 1.0 | 1.0 |
|  | "NONFREX OD-3" |  |  |  |  |  |
|  | "NOCRAC MBZ" | 1.5 | 1.5 | 1.5 | 1.5 | 1.5 |
|  | Wax |  | 1.0 |  |  |  |
|  | "ZISNET-F" | 1.0 |  | 1.0 | 1.0 | 1.0 |
|  | TAIC | 4.0 | 2.0 | 2.0 | 2.0 | 4.0 |
|  | DAP | 7.0 | 7.0 | 7.0 | 7.0 | 7.0 |
|  | Crosslinking agent/accelerator |  |  |  |  |  |
|  | Sulfur |  |  |  |  |  |
|  | TT |  |  |  |  |  |
|  | TS |  |  |  |  |  |
|  | CZ |  |  |  |  |  |
|  | "PARKADOX 14/40" | 5.0 | 7.5 | 7.5 | 7.5 | 7.5 |
| Physical Properties | Adhesiveness: brass Peel strength (N/25 mm) | 180 | 5 | 150 | 200 | 200 |
|  | Modulus M$_{100}$ (MPa) | 10.0 | 8.5 | 7.5 | 8.5 | 9.5 |
|  | Compression set resistance: 150° C. × 72 h Permanent compression deformation (%) | 30 | 30 | 50 | 40 | 35 |
|  | Heat resistance: 150° C. × 168 h air aging ΔE$_B$ (%) | −20 | −20 | −40 | −30 | −20 |

It is apparent that the rubber compositions (Examples 1 to 21) according to the first embodiment of the present invention show high adhesiveness to a metal and are also excellent in modulus (ex. tensile stress at 100% elongation), compression set resistance and heat resistance. On the other hand, where the rubber compositions do not contain both 2,4-dimercapto-6-substituted-1,3,5-triazine "ZISNET-F" represented by the formula 1 and the polymer having epoxy groups (Comparative Examples 1, 3, 5, 7, 9, 11 and 13), such rubber compositions do not adhere to a metal al all. Further, where the rubber compositions do not contain only the polymer having epoxy groups (Comparative Examples 2, 4, 6, 8, 10, 12 and 14), such rubber compositions adhere to a metal, but adhesive force is very weak and physical properties such as modulus are also poor.

It is apparent that when the rubber compositions contain triallyl isocyanurate and/or triallyl cyanurate, modulus is further improved in accordance with its content (Examples 1, 2, 4 to 8, 9 to 16 and 18 to 21), and when the rubber compositions contain silica, physical properties such adhesiveness to a metal and modulus are further improved (Examples 12, 13, 15, 16, 19 and 21).

EXAMPLES 22 AND 23 AND COMPARATRIVE 15 ANS 16

Step 1:

(1) Raw material rubber having epoxy group was introduced into Banbury mixer, and mixing was initiated.
(2) After 1 minute, compounding agents (carbon black, silica, zinc oxide, stearic acid, "NOCRAC MBZ", "SANWAX 171P" and 2,4,6-trimercapto-1,3,5-triazine "ZISNET-F") were further introduced.
(3) When the temperature of the rubber composition reached about 110° C., triallyl isocyanurate and diallyl phthalate were further introduced.
(4) A ram of Banbury mixer was moved up and down to turn reverse the rubber composition.
(5) When the temperature of the rubber composition reached about 130° C., the rubber composition was discharged, thereby completing Step 1.

Step 2:

(6) The rubber composition obtained in Step 1 was allowed to stand for cooling, and the rubber composition was introduced into Banbury mixer together with a crosslinking agent (organic peroxide), and mixing was again initiated.
(7) When the temperature of the rubber composition reached about 100° C., the rubber composition was discharged, thereby completing Step 2.

Physical property tests were conducted on the rubber compositions obtained above. The results obtained are shown in Table 2.

(2) After 1 minute, compounding agents (carbon black, silica, zinc oxide, stearic acid, "NOCRAC MBZ", "SANWAX 171P" were further introduced.

TABLE 2

|  |  | Comparative Example 15 | Example 22 | Comparative Example 16 | Example 23 |
|---|---|---|---|---|---|
| Rubber | Raw material rubber having epoxy group |  |  |  |  |
| Composition | ACM ("AR 31") | 100.0 | 100.0 |  |  |
|  | AEM ("ESPRENE EMA 2152") |  |  | 100.0 | 100.0 |
|  | Compounding agent |  |  |  |  |
|  | SRF grade carbon black | 95.0 | 95.0 | 95.0 | 95.0 |
|  | Zinc oxide | 2.0 | 2.0 | 2.0 | 2.0 |
|  | Stearic acid | 1.0 | 1.0 | 1.0 | 1.0 |
|  | "NOCRAC MBZ" | 1.5 | 1.5 | 1.5 | 1.5 |
|  | Wax | 1.0 | 1.0 | 1.0 | 1.0 |
|  | "ZISNET-F" |  | 1.0 |  | 1.0 |
|  | Crosslinking agent |  |  |  |  |
|  | Isocyanuric acid | 0.6 | 0.6 | 0.6 | 0.6 |
|  | Octdecyltrimethyl ammonium bromide | 1.8 | 1.8 | 1.8 | 1.8 |
|  | Diphenyl urea | 1.3 | 1.3 | 1.3 | 1.3 |
| Physical | Adhesiveness: brass | — | 150 | — | 170 |
| Properties | Peel strength (N/25 mm) |  |  |  |  |
|  | Modulus | 7.0 | 7.0 | 7.2 | 7.2 |
|  | $M_{100}$ (MPa) |  |  |  |  |
|  | Set resistance: 150° C. × 72 h | 30 | 28 | 30 | 28 |
|  | Permanent compression deformation (%) |  |  |  |  |
|  | Compression set resistance: | −25 | −23 | −20 | −18 |
|  | 150° C. × 168 h air aging $\Delta E_B$ (%) |  |  |  |  |

It is apparent that the rubber compositions (Examples 22 and 23) according to the first embodiment of the present invention show high adhesiveness to a metal and are also excellent in modulus, compression set resistance and heat resistance. On the other hand, where the rubber compositions do not contain both 2,4-dimercapto-6-substituted-1,3,5-triazine "ZISNET-F" represented by the formula 1 (Comparative Examples 15 and 16), such rubber compositions do not adhere to a metal al all.

EXAMPLE 24

Using HNBR and ethylene-acrylic acid ester-glycidyl methacrylate copolymer mentioned below, and the components shown in Table 3 in the compositions as shown in Table 3, a rubber composition was prepared in the same manner as in Example 1.

HNBR: Degree of hydrogenation 98.7% by mass, unit portion from unsaturated nitrile (Y portion; VCN) 33.0% by mass, unit portion from conjugated diene (Z portion; C=C) 1.3% by mass, unit portion from ethylenically unsaturated monomer other than the unsaturated nitrile (X portion; C—C) 65.7% by mass E-MA-GMA: "BOND FAST 7L", a product of Sumitomo Chemical Co., Ltd.

Physical property tests were conducted on the thus obtained rubber composition in the same manner as in Example 1. The results obtained are shown in Table 3.

EXAMPLE 25

Components having compositions as shown in Table 3 were mixed by the method described below to prepare a rubber composition.

Step 1:
(1) 100 Parts by mass of HNBR and 5.0 parts by mass of E-MA-GMA used in Example 24 were introduced into Banbury mixer, and mixing was initiated.

(3) When the temperature of the rubber composition reached about 110° C., triallyl isocyanurate and diallyl phthalate were further introduced.

(4) A ram of Banbury mixer was moved up and down to turn reverse the rubber composition.

(5) When the temperature of the rubber composition reached about 130° C., the rubber composition was discharged, thereby completing Step 1.

Step 2:

(6) The rubber composition obtained in Step 1 was allowed to stand for cooling, and the rubber composition was introduced into Banbury mixer together with 2,4,6-trimercapto-1,3,5-triazine "ZISNET-F" and a crosslinking agent (organic peroxide), and mixing was again initiated.

(7) When the temperature of the rubber composition reached about 100° C., the rubber composition was discharged, thereby completing Step 2.

Physical property tests were conducted on the rubber compositions obtained above. The results obtained are shown in Table 3.

COMPARATIVE EXAMPLE 17

A rubber composition was prepared in the same manner as in Example 24 except that the temperature of about 110° C. in (3) of Step 1 was changed about 130° C. and the temperature of about 130° C. in (5) of Step 1 was changed about 160° C. Physical properties of the rubber composition thus obtained were evaluated. The results obtained are shown in Table 3.

TABLE 3

| | | Example 24 | Example 25 | Comparative Example 17 |
|---|---|---|---|---|
| Rubber Composition | Raw material rubber | | | |
| | HNBR | 100.0 | 100.0 | 100.0 |
| | Y portion (VCN) | 33.0 | 33.0 | 33.0 |
| | Z portion (C=C) | 1.3 | 1.3 | 1.3 |
| | X portion (C—C) | 65.7 | 65.7 | 65.7 |
| | Polymer having epoxy group | | | |
| | E-MA-GMA | 5.0 | 5.0 | 5.0 |
| | Compounding agent | | | |
| | SRF grade carbon black | 95.0 | 95.0 | 95.0 |
| | Zinc oxide | 2.0 | 2.0 | 2.0 |
| | Stearic acid | 1.0 | 1.0 | 1.0 |
| | "NOCRAC MBZ" | 1.5 | 1.5 | 1.5 |
| | Wax | 1.0 | 1.0 | 1.0 |
| | "ZISNET-F" | 1.0 | 1.0 | 1.0 |
| | TAIC | 2.0 | 2.0 | 2.0 |
| | DAP | 7.0 | 7.0 | 7.0 |
| | Crosslinking agent "PARKADOX 14/40" | 7.5 | 7.5 | 7.5 |
| Physical Properties | Adhesiveness: brass Peel strength (N/25 mm) | 200 | 200 | 200 |
| | Modulus $M_{100}$ (MPa) | 9.2 | 10.0 | 10.1 |

The rubber compositions obtained by the production process of a rubber composition according to the second embodiment of the present invention (Examples 24 and 25) are mixed while maintaining the temperature of the rubber composition at 140° C. or lower through overall mixing steps, and therefore show high adhesiveness to a metal. In particular, it is apparent that when the temperature of the rubber composition in the steps after mixing 2,4-dimercapto-6-substituted-1,3,5-triazine "ZISNET-F" represented by the formula 1 is maintained at 100° C. or lower (Example 24), the rubber composition obtained is also excellent in modulus. On the other hand, when the temperature of the rubber composition exceeds 140° C. in overall mixing steps, adhesion stability to a metal is insufficient.

EXAMPLES 26 AND 27 AND COMPARATIVE EXAMPLES 18 TO 21

Using 100 parts by mass of HNBR shown below, 100 parts by mass of ethylene-acrylic acid ester copolymer rubber (AEM: "ESPRENE EMA-2752", a product of Sumitomo Chemical Co., Ltd.), 5,0 parts by mass of ethylene-acrylic ester-glycidyl methacrylate copolymer (E-MA-GMA: "BOND FAST 7L", a product of Sumitomo Chemical Company, Ltd.) and components shown in Table 4, in the proportions shown in Table 4, rubber compositions A to F were prepared in the same manner as in Example 25.

HNBR: Degree of hydrogenation 98.7%, unit portion from unsaturated nitrile (Y portion; VCN) 33.0% by mass, unit portion from conjugated diene (Z portion; C=C) 1.3% by mass, unit portion from ethylenically unsaturated monomer other than the unsaturated nitrile (X portion; C—C) 65.7% by mass Physical property tests of the rubber compositions obtained were conducted in the same manner as in Example 1. The results obtained are shown in Table 4.

TABLE 4

| | | Comparative Example 18 | Comparative Example 19 | Example 26 | Comparative Example 20 | Comparative Example 21 | Example 27 |
|---|---|---|---|---|---|---|---|
| Rubber | Title (Symbol) | C | D | A | E | F | B |
| | Raw material rubber | | | | | | |
| Composition | HNBR | 100.0 | 100.0 | 100.0 | | | |
| | Y portion (VCN) | 33.0 | 33.0 | 33.0 | | | |
| | Z portion (C=C) | 1.3 | 1.3 | 1.3 | | | |
| | X portion (C—C) | 65.7 | 65.7 | 65.7 | | | |
| | AEM ("ESPRENE EMA 2152") | | | | 100.0 | 100.0 | 100.0 |
| | Polymer having epoxy group | | | | | | |
| | E-MA-GMA | | | 20.0 | | | 20.0 |
| | Compounding agent | | | | | | |
| | SRF grade carbon black | 95.0 | 95.0 | 95.0 | 95.0 | 95.0 | 95.0 |
| | Zinc oxide | 2.0 | 2.0 | 2.0 | 2.0 | 2.0 | 2.0 |
| | Stearic acid | 1.0 | 1.0 | 1.0 | 1.0 | 1.0 | 1.0 |
| | "NOCRAC MBZ" | 1.5 | 1.5 | 1.5 | 1.5 | 1.5 | 1.5 |
| | Wax | 1.0 | 1.0 | 1.0 | 1.0 | 1.0 | 1.0 |
| | "ZISNET-F" | | 1.0 | 1.0 | | 1.0 | 1.0 |
| | TAIC | 2.0 | 2.0 | 2.0 | 2.0 | 2.0 | 2.0 |
| | DAP | 7.0 | 7.0 | 7.0 | 7.0 | 7.0 | 7.0 |
| | Crosslinking agent "PARKADOX 14/40" | 7.5 | 7.5 | 7.5 | 7.5 | 7.5 | 7.5 |
| Physical Properties | Adhesiveness: brass Peel strength (N/25 mm) | — | 75 | 260 | — | 10 | 260 |
| | Modulus $M_{100}$ (MPa) | 11.0 | 10.0 | 10.3 | 11.0 | 9.7 | 10.3 |
| | Compression set resistance: 150° C. × 72 h Permanent compression deformation (%) | 40 | 42 | 42 | 40 | 42 | 50 |
| | Heat resistance: 150° C. × 168 h air aging $\Delta E_B$ (%) | −20 | −50 | −30 | −20 | −30 | −31 |

Using the following materials, hoses were prepared in the following method.
(1) Inner Tube Rubber compositions A to F obtained above, as shown in Table
(2) Reinforcing Layer Reinforcing steel wires plated with brass (expressed as 1W/B)
(3) Outer Cover Rubber compositions B, E and F obtained above, as shown in Table 4

Each of the rubber compositions A to F for an inner tube was extruded on a mandrel having an outer diameter of 12.4 mm previously coated with a release agent, using an extruder for rubber to form an inner tube. Reinforcing steel wires plated with brass were braided on the inner tube to form a reinforcing layer. Each of the rubber compositions B, E and F for an outer cover was extruded on the reinforcing layer using an extruder for rubber to form an outer cover. The mandrel was pulled out, thereby obtaining a hose having a structure shown in Table 5. The hose had an inner diameter of 12.7 and an outer diameter of 20.0 mm.

The following tests were conducted on the respective hose obtained above. The results obtained are shown in Table 5.

Metal Coupling Test

Outer cover rubber on a coupling portion of the hose was removed by buffing, and a given coupling was fitted thereon. When it was possible to fit the coupling, it was indicated as O, and when it was difficult to fit the coupling, it was indicated as X. The reasons that it is difficult to fit are that adhesion between the inner tube rubber and the reinforcing layer is insufficient and the reinforcing layer expands toward a circumferential direction. Hoses that fitment was difficult to fit thereon could not be used for evaluation of properties.

Durability Test

Impact pressure test was conducted according to the definition of JIS K6330-8. Using auto multi oil for test (Idemitsu Kosan Co.), impact pressure was repeatedly applied under the conditions of 150° C. and 16 MPa, and the number of impact applied when abnormality occurs in hose was counted. When the hose did not cause abnormality after the number of impact applied of 1,000,000 times, it was evaluated as O.

It is apparent that the hose according to the third embodiment of the present invention (Example 26) using the rubber composition containing HNBR for the inner tube and using the rubber composition containing AEM for the outer cover and the hose according to the second embodiment of the present invention (Example 27) using the rubber composition containing AEM for the inner tube and also the outer cover have excellent adhesiveness to fitment and durability. On the other hand, in the case that the rubber composition which does not contain 2,4-dimercapto-6-substituted-1,3,5-triazine "ZISNET-F" represented by the formula 1 and the polymer having epoxy group are used for the inner tube and the outer cover (Comparative Examples 18 and 20), the inner tube and the outer cover do not adhere to the reinforcing layer. Therefore, after removing the outer cover, the outer diameter of the reinforcing layers increases (the reinforcing layer expands toward the circumferential direction), and the metal coupling could not be fitted. Further, in the case that the rubber composition does not contain only the polymer having epoxy group (Comparative Examples 19 and 21), adhesive force between the inner tuber/the outer cover and the reinforcing layer is weak. Therefore, although the metal coupling can be fitted, but the durability is poor.

EXAMPLES 28 TO 32 AND COMPARATIVE EXAMPLES 22 TO 27

The components shown below were introduced into a mixer in proportions shown in Table 6 and mixed. The mixture was heat treated under the conditions of 160° C. and 1 hour with a heater to obtain triallyl isocyanuarte (TAIC) and/or triallyl cyanurate and their polymers (including oligomers) supported on silica (solidified products). The mixture before heat treatment was in a wet state, but after heat treatment, solidified products and materials still in a wet state were present.

The Solidified Products were Granular.

Triallyl isocyanurate (TAIC)
Triallyl cyanurate (TAC)
Silica ($SiO_2$): "NIPSIL VN3", a product of Nippon Silica Industrial Co., Ltd., specific surface area: about 200 $m^2/g$, average particle size: 16 $\mu$m
Calcium carbonate: ground limestone, a product of Maruo Calcium Co.
Kaolin clay (aluminum silicate): "SUPREX.CLAY", a product of Huber Co.
Talc (magnesium silicate): "MISTRON VAPER", a product of Nippon Mistron Co., Ltd.
Diatomaceous earth (hydrous colloidal silicic acid), a product of Tokyo Keisodo K.K.
State of the mixture, state of the composition after heating and hydrophobicity are shown in Table 6. The hydropho-

TABLE 5

| | | Comparative Example 18 | Comparative Example 19 | Example 26 | Comparative Example 20 | Comparative Example 21 | Example 27 |
|---|---|---|---|---|---|---|---|
| Hose Structure | Inner tube, rubber composition | C | D | A | E | F | B |
| | Reinforcing layer | 1 W/B | 1 W/B | 1 W/B | 1 W/B | 1 W/B | 1 W/B |
| | Outer cover, rubber composition | E | F | B | E | F | B |
| Physical Properties | Fitment fitting property | X | O | O | X | O | O |
| | Durability | — | (a) | O | X | (a) | O |

(a) 400,000–500,000 times: Inner face was cured and cracked.

bicity was evaluated by introducing the solidified product into water at room temperature, stirring the mixture, allowing to stand the mixture and observing the state of floating and sinking of the solidified product. The material of Comparative Example 22 quickly sinks in water and thus has hydrophilicity. The materials of Examples 28 to 32 disperse in water or float on water. Thus, it is apparent that hydrophobicity is imparted to hydrophilic silica and as a result, dispensability in resin, rubber and the like is improved.

Magnesia (MgO)
Zinc oxide (ZnO)
Stearic acid

TABLE 6

| | | | Comparative Example 22 | Example 28 | Example 29 | Example 30 | Example 31 | Comparative Example 23 |
|---|---|---|---|---|---|---|---|---|
| Components | Crosslinking aids | | | | | | | |
| | | TAIC | 10.0 | 30.0 | 50.0 | 70.0 | 80.0 | 90.0 |
| | | TA | | | | | | |
| | Inorganic filler | | | | | | | |
| | | Silica | 90.0 | 70.0 | 50.0 | 30.0 | 20.0 | 10.0 |
| | | Calcium carbonate | | | | | | |
| | | Kaolin clay | | | | | | |
| | | Talc | | | | | | |
| | | Diatomaceous earth | | | | | | |
| Mixture | | State of mixture (b) | Wet | Wet | Paste-like | Paste-like | Paste-like | Paste-like |
| | | State after heat treatment | Solidified | Solidified | Solidified | Solidified | Solidified | Wet |
| | | Heat treatment condition: 160° C. × 1 hour | | | | | | |
| | | Hydrophobicity after heat treatment | Quickly sunk | Dispersed and slowly sunk | Dispersed and slightly sunk | Dispersed | Floated | Not evaluated |

| | | | Example 32 | Comparative Example 24 | Comparative Example 25 | Comparative Example 26 | Comparative Example 27 |
|---|---|---|---|---|---|---|---|
| Components | Crosslinking aids | | | | | | |
| | | TAIC | | 50.0 | 50.0 | 50.0 | 50.0 |
| | | TA | 70.0 | | | | |
| | Inorganic filler | | | | | | |
| | | Silica | 30.0 | | | | |
| | | Calcium carbonate | | 50.0 | | | |
| | | Kaolin clay | | | 50.0 | | |
| | | Talc | | | | 50.0 | |
| | | Diatomaceous earth | | | | | 50.0 |
| Mixture | | State of mixture (b) | Paste-like | Paste-like | Paste-like | Paste-like | Wet |
| | | State after heat treatment | Solidified | Paste-like | Paste-like | Paste-like | Wet |
| | | Heat treatment condition: 160° C. × 1 hour | | | | | |
| | | Hydrophobicity after heat treatment | Dispersed | Not evaluated | Not evaluated | Not evaluated | Not evaluated |

(b) After mixing, allowing to stand at room temperature for 1 hour.

EXAMPLES 33 TO 44 AND COMPARATIVE EXAMPLES 28 TO 52

Solidified products or wet materials shown in Table 6 and the following components were mixed in proportions shown in Tables 7(a) to 7(e), and crosslinking the rubber with an organic peroxide was conducted.

Ethylene-propylene copolymer rubber (EPM): "JSR EP-11", a product of Japan Synthetic Rubber Co., Ltd.

Chlorinated polyethylene rubber (CM): "ELASRENE 301A", a product of Showa Denko K.K.

HNBR: Degree of hydrogenation 98.7%, unit portion from unsaturated nitrile (Y portion; VCN) 33.0% by mass, unit portion from conjugated diene (Z portion; C=C) 1.3% by mass, unit portion from ethylenically unsaturated monomer other than the unsaturated nitrile (X portion; C—C) 65.7% by mass E-MA-GMA (ethylene-acrylic acid ester-dlycidyl methacrylate copolymer): "BOND FAST 7L", a product of Sumitomo Chemical Co., Ltd.

Silica (SiO$_2$): "NIPSIL VN3", a product of Nippon Silica Industrial Co., Ltd.

FEF grade carbon black: "HTC-100", a product of Shin-Nittetsu Carbon K.K.

Wax: "SANWAX 171P", a product of Sanyo Kasei Chemical Industrial Co., Ltd.

Processing aid: "AMINE 18D", a product of Lion.Akzo Co.

Paraffinic oil: "SANPER 2280", a product of Nippon Sun Oil K.K.

Plasticizer: "ADEKASIZER C9N", a product of Asahi Denka Kogyo K.K.

Epoxy resin: "SUMIEPOXY ELA-115", a product of Sumitomo Chemical Co. Ltd.

Triallyl isocyanurate (TAIC)

1% Vinyltrimethoxysilane-treated silica: a product of Tatsumori K.K.

Organic peroxide: "PARCADOX 14/40", a product of Kayaku Akzo Co.

Modulus test and heat resistance tests were conducted on the rubber compositions obtained. The results obtained are shown in Tables 7(a) to 7(e).

It is apparent that in the case of compounding the solidified product of Examples 29, 30 and 32, modulus improvement effect is large and lowering heat resistance is suppressed, as compared with the case of adding TAIC and/or TAC and silica, individually (Comparative Examples 28 to 31), under the conditions that the compounding amount of net TAIC and/or TAC is the same.

Table 7 (b)

| | | Comparative Example 32 | Comparative Example 33 | Comparative Example 34 | Comparative Example 35 | Comparative Example 36 | Comparative Example 37 | Comparative Example 38 |
|---|---|---|---|---|---|---|---|---|
| Rubber Composition | Raw material rubber | | | | | | | |
| | EPM | | | | | | | |
| | CM | | | | | | | |
| | E-MA-GMA {"BOND FAST 7L"} | | | | | | | |
| | HNBR | 100.0 | 100.0 | 100.0 | 100.0 | 100.0 | 100.0 | 100.0 |
| | Compounding agent | | | | | | | |
| | Silica | | 0.6 | 1.5 | 2.1 | 3.0 | 4.5 | 6.0 |
| | FEF grade carbon black | 70.0 | 70.0 | 70.0 | 70.0 | 70.0 | 70.0 | 70.0 |
| | Magnesia | 10.0 | 10.0 | 10.0 | 10.0 | 10.0 | 10.0 | 10.0 |
| | Zinc oxide | 2.0 | 2.0 | 2.0 | 2.0 | 2.0 | 2.0 | 2.0 |
| | Stearic acid | 1.0 | 1.0 | 1.0 | 1.0 | 1.0 | 1.0 | 1.0 |
| | Wax | 1.0 | 1.0 | 1.0 | 1.0 | 1.0 | 1.0 | 1.0 |
| | Paraffinic oil | | | | | | | |
| | "ADEKASIZER C9N" | 7.0 | 7.0 | 7.0 | 7.0 | 7.0 | 7.0 | 7.0 |
| | "SUMIEPOXY ELA-115" | | | | | | | |
| | Crosslinking aids | | | | | | | |
| | TAIC | 0.0 | 1.4 | 3.5 | 4.9 | 7.0 | 10.5 | 14.0 |
| | Solidified product of Example 29 (TAIC: 50%) | | | | | | | |
| | Solidified product of Example 30 {TAIC: 70%} | | | | | | | |
| | Solidified product of Example 32 (TAC: 70%) | | | | | | | |
| | Wet product of Comparative Example 27 {TAIC: 50%} | | | | | | | |
| | Crosslinking agent "PARKADOX 14/40" | 7.5 | 7.5 | 7.5 | 7.5 | 7.5 | 7.5 | 7.5 |
| | Net TAIC compounding amount | 0.0 | 1.4 | 3.5 | 4.9 | 7.0 | 10.5 | 14.0 |
| Physical Properties | Ordinary physical property, modulus $M_{100}$ (MPa) | 8.5 | 9.3 | 10.2 | 10.7 | 11.5 | 12.3 | 12.8 |
| | Heat resistance: 150° C. × 168 h air aging $\Delta E_B$ {%} | −25 | −32 | −40 | −43 | −46 | −49 | −51 |

Table 7 (c)

| | | Example 37 | Example 38 | Example 39 | Example 40 | Example 41 | Example 42 |
|---|---|---|---|---|---|---|---|
| Rubber Composition | Raw material rubber | | | | | | |
| | EPM | | | | | | |
| | CM | | | | | | |
| | E-MA-GMA {"BOND FAST 7L"} | | | | | | |
| | HNBR | 100.0 | 100.0 | 100.0 | 100.0 | 100.0 | 100.0 |
| | Compounding agent | | | | | | |
| | Silica | | | | | | |
| | FEF grade carbon black | 70.0 | 70.0 | 70.0 | 70.0 | 70.0 | 70.0 |
| | Magnesia | 10.0 | 10.0 | 10.0 | 10.0 | 10.0 | 10.0 |
| | Zinc oxide | 2.0 | 2.0 | 2.0 | 2.0 | 2.0 | 2.0 |
| | Stearic acid | 1.0 | 1.0 | 1.0 | 1.0 | 1.0 | 1.0 |
| | Wax | 1.0 | 1.0 | 1.0 | 1.0 | 1.0 | 1.0 |
| | Paraffinic oil | | | | | | |
| | "ADEKASIZER C9N" | 7.0 | 7.0 | 7.0 | 7.0 | 7.0 | 7.0 |
| | "SUMIEPOXY ELA-115" | | | | | | |
| | Crosslinking aids | | | | | | |
| | TAIC | | | | | | |
| | Solidified product of Example 29 (TAIC: 50%) | | | | | | |
| | Solidified product of Example 30 (TAIC: 70%) | 2.0 | 5.0 | 7.0 | 10.0 | 15.0 | 20.0 |
| | Solidified product of Example 32 {TAIC: 70%} | | | | | | |
| | Wet product of Comparative Example 27 (TAIC: 50%) | | | | | | |
| | Crosslinking agent "PARKADOX 14/40" | 7.5 | 7.5 | 7.5 | 7.5 | 7.5 | 7.5 |
| | Net TAIC compounding amount | 1.4 | 3.5 | 4.9 | 7.0 | 10.5 | 14.0 |
| Physical Properties | Ordinary physical property, modulus $M_{100}$ {MPa} | 9.5 | 11.0 | 12.0 | 13.5 | 16.0 | 18.6 |
| | Heat resistance: 150° C. × 168 h air aging $\Delta E_B$ | −27 | −30 | −32 | −34 | −35 | −35 |

-continued (%)

Table 7 (d)

| | | Comparative Example 39 | Comparative Example 40 | Comparative Example 41 | Comparative Example 42 |
|---|---|---|---|---|---|
| Rubber Composition | Raw material rubber | | | | |
| | EPM | | | | |
| | CM | | | | |
| | E-MA-GMA ("BOND FAST 7L") | 100.0 | 100.0 | 100.0 | 100.0 |
| | HNBR | | | | |
| | Compounding agent | | | | |
| | Silica | 70.0 | 70.0 | 70.0 | 70.0 |
| | FEF grade carbon black | 10.0 | 10.0 | 10.0 | 10.0 |
| | Magnesia | 2.0 | 2.0 | 2.0 | 2.0 |
| | Zinc oxide | 1.0 | 1.0 | 1.0 | 1.0 |
| | Stearic acid | 1.0 | 1.0 | 1.0 | 1.0 |
| | Wax | | | | |
| | Paraffinic oil | 7.0 | 7.0 | 7.0 | 7.0 |
| | "ADEKASIZER C9N" | | | | |
| | "SUMIEPOXY ELA-115" | | | | |
| | Crosslinking aids | | | | |
| | TAIC | | | | |
| | Solidified product of Example 29 (TAIC: 50%) | | | | |
| | Solidified product of Example 30 (TAIC: 70%) | | | | |
| | Solidified product of Example 32 {TAC: 70%} | | | | |
| | Wet product of Comparative Example 27 (TAIC: 50%) | 2.3 | 5.8 | 8.2 | 11.7 |
| | Crosslinking agent | 7.5 | 7.5 | 7.5 | 7.5 |
| | "PARKADOX 14/40" | | | | |
| | Net TAIC compounding amount | 1.4 | 3.5 | 4.9 | 7.0 |
| Physical Properties | Ordinary physical property, modulus $M_{100}$ (MPa) | 9.1 | 9.8 | 10.1 | 10.7 |
| | Heat resistance: 150° C. × 168 h air aging $\Delta E_B$ (%) | −31 | −39 | −42 | −45 |

Table 7 (d)

| | | Comparative Example 43 | Comparative Example 44 | Comparative Example 45 | Comparative Example 46 | Comparative Example 47 |
|---|---|---|---|---|---|---|
| Rubber Composition | Raw material rubber | | | | | |
| | EPM | | | | | |
| | CM | | | | | |
| | E-MA-GMA ("BOND FAST 7L") | 100.0 | 100.0 | 100.0 | 100.0 | 100.0 |
| | HNBR | | | | | |
| | Compounding agent | | | | | |
| | Silica | 70.0 | 70.0 | 70.0 | 70.0 | 70.0 |
| | FEF grade carbon black | 10.0 | 10.0 | 10.0 | 10.0 | 10.0 |
| | Magnesia | 2.0 | 2.0 | 2.0 | 2.0 | 2.0 |
| | Zinc oxide | 1.0 | 1.0 | 1.0 | 1.0 | 1.0 |
| | Stearic acid | 1.0 | 1.0 | 1.0 | 1.0 | 1.0 |
| | Wax | | | | | |
| | Paraffinic oil | 7.0 | 7.0 | 7.0 | 7.0 | 7.0 |
| | "ADEKASIZER C9N" | | | | | |
| | "SUMIEPOXY ELA-115" | | | | | |
| | Crosslinking aids | | | | | |
| | TAIC | | | | | |
| | Solidified product of Example 29 (TAIC: 50%) | | | | | |
| | Solidified product of Example 30 (TAIC: 70%) | | | | 0.1 | 0.5 |
| | Solidified product of Example 32 (TAC: 70%) | | | | | |
| | Wet product of Comparative Example 27 (TAIC: 50%) | 17.5 | 23.3 | | | |
| | Crosslinking agent | 7.5 | 7.5 | 7.5 | 7.5 | 7.5 |
| | "PARKADOX 14/40" | | | | | |
| | Net TAIC compounding amount | 10.5 | 14.0 | 0.00 | 0.07 | 0.35 |
| Physical Properties | Ordinary physical property, modulus $M_{100}$ (MPa) | 11.1 | 11.2 | 8.5 | 8.5 | 8.7 |
| | Heat resistance: 150° C. × 168 h air aging $\Delta E_B$ (%) | −48 | −50 | −25 | −25 | −26 |

Table 7 (e)

| Comparative Example 48 | Example 44 | Example 45 | Comparative Example 48 | Example 46 | Comparative Example 50 | Comparative Example 51 | Comparative Example 52 |
|---|---|---|---|---|---|---|---|

-continued

| Rubber Composition | Raw material rubber | | | | | | | | |
|---|---|---|---|---|---|---|---|---|---|
| | EPM | | | | | | | | |
| | CM | | | | | | | | |
| | E-MA-GMA ("BOND FAST 7L") | | | | | | | | |
| | HNBR | 100.0 | 100.0 | 100.0 | 100.0 | 100.0 | 100.0 | 100.0 | 100.0 |
| | Compounding agent | | | | | | | | |
| | Silica | 3.0 | | | 7.0 | | | | |
| | FEF grade carbon black | 70.0 | 70.0 | 70.0 | 70.0 | 70.0 | 70.0 | 70.0 | 70.0 |
| | Magnesia | 10.0 | 10.0 | 10.0 | 10.0 | 10.0 | 10.0 | 10.0 | 10.0 |
| | Zinc oxide | 2.0 | 2.0 | 2.0 | 2.0 | 2.0 | 2.0 | 2.0 | 2.0 |
| | Stearic acid | 1.0 | 1.0 | 1.0 | 1.0 | 1.0 | 1.0 | 1.0 | 1.0 |
| | Wax | 1.0 | 1.0 | 1.0 | 1.0 | 1.0 | 1.0 | 1.0 | 1.0 |
| | Paraffinic oil "ADEKA-SIZER C9N" | 7.0 | 7.0 | 7.0 | 7.0 | 7.0 | 7.0 | 7.0 | 7.0 |
| | "SUMIEPOXY ELA-115" | | | | | | | | |
| | Crosslinking aids | | | | | | | | |
| | TAIC | 7.0 | | | 7.0 | | | | |
| | Solidified product of Example 29 (TAIC: 50%) | | 10.0 | | | 14.0 | | | |
| | Solidified product of Example 30 (TAIC: 70%) | | | 10.0 | | | | | |
| | Solidified product of Example 32 (TAC: 70%) | | | | | | | | |
| | Wet product of Comparative Example 27 (TAIC: 50%) | | | | | | | | |
| | 1% Vinyltri-methoxysilane-trealted silica | | | | | | 3.0 | 7.0 | 20.0 |
| | Crosslinking agent "PARKADOX 14/40" | 7.5 | 7.5 | 7.5 | 7.5 | 7.5 | 7.5 | 7.5 | 7.5 |
| | Net TAIC compounding amount | 7.0 | 7.0 | 7.0 | 7.0 | 7.0 | 0.0 | 0.0 | 0.0 |
| Physical Properties | Ordinary physical property, modulus $M_{100}$ (MPa) | 11.5 | 13.5 | 13.4 | 11.6 | 12.9 | 8.8 | 9.2 | 10.5 |
| | Heat resistance: 150° C. × 168 h air aging $\Delta E_B$ (%) | −46 | −34 | −34 | −46 | −39 | −25 | −26 | −27 |

Figure 2:
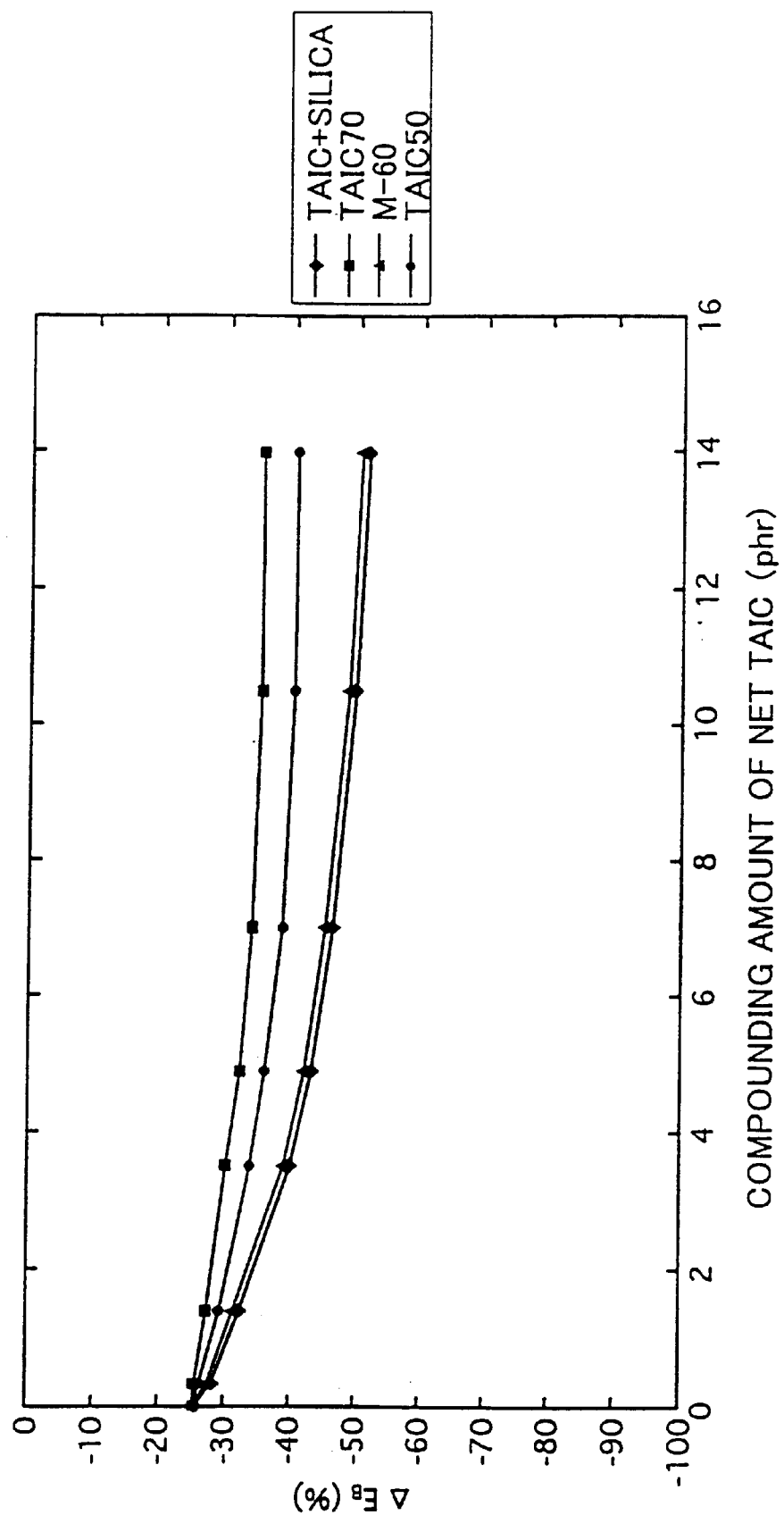
FIG. 2 is a graph showing that the solidified product (triallyl isocyanurate and/or triallyl cyanurate supported on silica) of the present invention suppresses lowering heat resistance of the rubber composition.

From the results obtained in Tables 7(a) to 7(e), the change of $M_{100}$ and $\Delta E_B$ to the net TAIC compounding amount in (TAIC+silica) in the case of using the solidified product (TAIC 50, TAC 70) of the present invention as a crosslinking aid, in the case of using the wet material (M-60) outside the scope of the composition of the present invention and in the case of using TAIC as a crosslinking aid and separately adding silica alone is shown in graphs of FIGS. 1 and 2. It is apparent from the results shown in FIG. 1 that where the solidified product of the present invention is used, modulus improves in proportion to the compounding amount of TAIC. It is apparent from the results shown in FIG. 2 that if the solidified product of the present invention is used, even if the compounding amount of TAIC is increased, lowering heat resistance can be maintained within a certain range.

The rubber composition containing 2,4-dimercapto-6-substituted-1,3,5-triazine and the polymer having epoxy groups, obtained by the production process of the present invention exhibits adhesion stability to a metal. Further, the rubber composition containing 2,4-dimercapto-6-substituted-1,3,5-triazine and the polymer having epoxy groups of the present invention has high adhesiveness to a metal, particularly copper or copper alloy, high modulus, high compression set resistance and high heat resistance, and therefore can be used in composite products of rubber and metal. Particularly copper or copper alloy, such as hoses, belts, tires, rolls and mold goods. In particular, the rubber composition of the present invention can suitably used in composite rubber products with brass, bronze-plated steel plates and reinforcing steel wires.

The hose using the rubber composition of the present invention to an inner tube or the like has excellent adhesiveness between the inner tube or the like and the reinforcing layer and excellent heat resistance, and also has sufficient modulus and compression set resistance, and therefore can suitably be used in oil pressure hoses, hot water hoses, steam hoses and the like.

The solidified product of the present invention (TAIC and/or TAC supported on silica) has good handling properties, and can improve modulus while maintaining high heat resistance when it is used in a rubber composition crosslinked with an organic peroxide, particularly a rubber composition containing a polymer in which the main chain is a methylene chain, as a compounding agent for rubber, and the like.

The rubber composition containing the solidified product of the present invention has both high heat resistance and high modulus, and therefore can suitably be used in rubber products such as belts, rolls, molded products, seals, oil pressure hoses, hot water hoses and steam hoses.

What is claimed is:

1. A rubber composition comprising:
   (1) 100 parts by mass of a raw material rubber, with the exception of a copolymer rubber having an iodine value of 15 or less containing, in polymer chain, 10 to 45% by mass of a unit portion (Y portion; VCN) from unsaturated nitrile, 0 to 5% by mass of a unit portion (Z portion; C=C) from conjugated diene and 90 to 50% by mass of a unit portion (X portion; C—C) obtained by hydrogenating the unit portion from an ethylenically unsaturated monomer other than unsaturated nitrile and/or from conjugated diene;
   (2) 0.1 to 15 parts by mass of 2,4-dimercapto-6-substituted-1,3,5-triazine represented by the following formula 1:

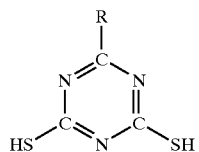

wherein R represents a group selected from the group consisting of mercapto group, alkoxyl group, monoalkylamino group, diaklylamino group, monocycloalkylamino group, dicycloalkylamino group and N-alkyl-N-arylamino group; and
   (3) 1 to 100 parts by mass of an ethylene polymer or a diene polymer having epoxy groups as graft chains, which is crosslinkable with the raw material rubber.

2. The rubber composition as claimed in claim 1, wherein the raw material rubber is an organic peroxide-crosslinkable raw material rubber, and the ethylene polymer or the diene polymer having epoxy groups as graft chains is an organic peroxide-crosslinkable polymer.

3. The rubber composition as claimed in claim 2, wherein the organic peroxide-crosslinkable raw material rubber is a diene rubber.

4. The rubber composition as claimed in claim 2, wherein the organic peroxide-crosslinkable raw material rubber is a non-diene rubber.

5. The rubber composition as claimed in claim 2, wherein the organic peroxide-crosslinkable raw material rubber is at least one member selected from the group consisting of ethylene-acrylic acid ester copolymer rubber, ethylene-acrylic acid ester-vinyl acetate copolymer rubber, ethylene-vinyl acetate copolymer rubber, ethylene-propylene copolymer rubber, ethylene-propylene-diene copolymer rubber, chlorinated polyethylene rubber and chlorosulfonated polyethylene rubber.

6. The rubber composition as claimed in claim 3, wherein the diene rubber is acrylonitrile-butadiene copolymer rubber.

7. The rubber composition as claimed in claim 1, wherein the raw material rubber is a sulfur-crosslinkable raw material rubber, and the ethylene polymer or the diene polymer having epoxy groups as graft chains is a sulfur-crosslinkable polymer.

8. The rubber composition as claimed in claim 1, wherein the raw material rubber and the ethylene polymer or the diene polymer having epoxy groups as graft chains are a raw material rubber having epoxy groups.

9. The rubber composition as claimed in claim 8, wherein the raw material rubber having epoxy groups is acrylic rubber containing a monomer having epoxy groups as a copolymerizable component.

10. The rubber composition as claimed in any one of claims 1 to 9, wherein the rubber composition further comprises 0.1 to 30 parts by mass of at least one member selected from the group consisting of triallyl isocyanurate and triallyl cyanurate.

11. The rubber composition as claimed in any one of claims 1 to 9, wherein the rubber composition further comprises 1 to 50 parts by mass of silica.

* * * * *